United States Patent
Dayton

(10) Patent No.: US 10,213,053 B2
(45) Date of Patent: Feb. 26, 2019

(54) WHISK MIXING SYSTEMS WITHIN A CONTAINER

(71) Applicant: ADIP Management, LLC, Draper, UT (US)

(72) Inventor: Angela Peterson Dayton, Draper, UT (US)

(73) Assignee: ADIP MANAGEMENT, LLC, Draper, UT (US)

( * ) Notice: Subject to any disclaimer, the term of this patent is extended or adjusted under 35 U.S.C. 154(b) by 72 days.

(21) Appl. No.: 15/233,869

(22) Filed: Aug. 10, 2016

(65) Prior Publication Data

US 2017/0065942 A1 Mar. 9, 2017

Related U.S. Application Data

(63) Continuation-in-part of application No. 14/847,963, filed on Sep. 8, 2015, now Pat. No. 10,099,187.

(51) Int. Cl.
*A47J 43/27* (2006.01)
*B01F 13/00* (2006.01)
(Continued)

(52) U.S. Cl.
CPC .............. *A47J 43/27* (2013.01); *A47J 31/005* (2013.01); *B01F 13/005* (2013.01);
(Continued)

(58) Field of Classification Search
CPC ... A47J 43/27; A47J 43/1081; B01F 13/0022; B01F 13/0055; B01F 7/00075;
(Continued)

(56) References Cited

U.S. PATENT DOCUMENTS

| 151,640 | A | * | 6/1874 | Wheelwright | ........ | F26B 17/003 |
| | | | | | | 202/103 |
| 2,204,029 | A | * | 6/1940 | Russell | ................... | B01F 5/223 |
| | | | | | | 366/305 |

(Continued)

FOREIGN PATENT DOCUMENTS

| EP | 914197 B1 | 5/2001 |
| EP | 2771253 A1 | 9/2014 |

(Continued)

OTHER PUBLICATIONS https://www.kickstarter.com/projects/956156534/titan-mixer-bottle-worlds-most-revolutionary-mixer/decription, (video believed to have been posted online prior to Sep. 8, 2015).

*Primary Examiner* — Abbas Rashid
(74) *Attorney, Agent, or Firm* — David Meibos; Maywood IP Law

(57) ABSTRACT

A mixing system and method may be used to facilitate mixture of ingredients within a container such as a bottle for mixing fitness and recreational beverages and the like. The mixing system may include a mixing apparatus with a container engagement component that couples the mixing system to the container, and a mixing component that mixes the ingredients. The mixing component may have a shaft, a plurality of rotatable mixing members that are rotatable about the shaft, and a plurality of stationary mixing members that are fixedly secured to the shaft. The mixing members may be arranged to contact the ingredients in a manner that facilitates mixture of the ingredients together, in response to repetitive motion of the container.

19 Claims, 11 Drawing Sheets

(51) Int. Cl.
*A47J 31/00* (2006.01)
*B65D 51/32* (2006.01)
*B01F 15/00* (2006.01)

(52) U.S. Cl.
CPC ...... *B01F 13/0022* (2013.01); *B01F 13/0055* (2013.01); *B01F 15/00512* (2013.01); *B65D 51/32* (2013.01); *B01F 2215/0022* (2013.01); *B01F 2215/0032* (2013.01)

(58) Field of Classification Search
CPC ... B01F 7/1605; B01F 13/005–13/0057; B01F 15/00512
USPC .. 366/129–130, 248, 293, 312, 316, 325.93, 366/330.3–330.5, 330.7
See application file for complete search history.

(56) References Cited

U.S. PATENT DOCUMENTS

| | | | | |
|---|---|---|---|---|
| 2,939,770 | A * | 6/1960 | Schwartzkopff | B01J 19/20 159/25.2 |
| 4,737,036 | A * | 4/1988 | Offermann | A23G 3/0221 366/130 |
| 4,818,114 | A | 4/1989 | Ghavi | |
| 4,916,672 | A * | 4/1990 | McCrory | B01F 7/00583 366/130 |
| 5,199,788 | A * | 4/1993 | Stallings | B01F 7/1695 366/247 |
| 5,368,389 | A | 11/1994 | Dedoes | |
| 5,433,328 | A | 7/1995 | Baron | |
| 5,497,695 | A * | 3/1996 | Canela | A47J 36/06 366/130 |
| 5,638,968 | A | 6/1997 | Baron | |
| 5,794,802 | A | 8/1998 | Caola | |
| 6,045,254 | A | 4/2000 | Inbar | |
| 6,079,405 | A | 6/2000 | Justo | |
| 6,241,381 | B1 * | 6/2001 | Noda | B01F 3/0478 366/262 |
| 6,257,428 | B1 | 7/2001 | Caola | |
| 6,345,908 | B1 * | 2/2002 | Gmeiner | B01D 19/0052 366/139 |
| 6,379,032 | B1 | 4/2002 | Sorensen | |
| 6,616,319 | B2 | 9/2003 | Renz | |
| 7,036,975 | B2 | 5/2006 | Renz | |
| 7,513,678 | B2 * | 4/2009 | Venus | B01F 7/001 366/129 |
| 7,731,101 | B2 * | 6/2010 | Fabrizio | A47J 43/1093 239/12 |
| 7,810,661 | B2 | 10/2010 | Murphy | |
| 7,866,465 | B2 * | 1/2011 | Dverin | B01F 15/0087 206/219 |
| 8,033,713 | B2 | 10/2011 | Lion | |
| 8,167,175 | B2 | 5/2012 | Jaouen | |
| 8,313,228 | B2 | 11/2012 | Reay | |
| 8,371,440 | B2 | 2/2013 | Questad | |
| 8,413,803 | B2 | 4/2013 | Questad | |
| 8,534,908 | B2 | 9/2013 | Rhodes, II | |
| 8,939,305 | B2 | 1/2015 | Meyers | |
| D723,325 | S | 3/2015 | Enghard | |
| 9,010,993 | B1 * | 4/2015 | Overton | B01F 15/0085 366/189 |
| 2003/0218935 | A1 | 11/2003 | Hu | |
| 2004/0013030 | A1 | 1/2004 | Renz | |
| 2005/0105387 | A1 | 5/2005 | Nikkhah | |
| 2008/0156763 | A1 | 7/2008 | Murphy | |
| 2008/0259723 | A1 | 10/2008 | Rhodes | |
| 2010/0302897 | A1 | 12/2010 | George | |
| 2011/0011819 | A1 | 1/2011 | Lee | |
| 2011/0024464 | A1 | 2/2011 | Jaouen | |
| 2012/0318765 | A1 | 12/2012 | Questad | |
| 2012/0318766 | A1 | 12/2012 | Questad | |
| 2013/0010568 | A1 | 1/2013 | Bodum | |
| 2013/0201783 | A1 * | 8/2013 | Stewart | B01F 13/0022 366/130 |
| 2013/0279287 | A1 * | 10/2013 | Cerasani | B65D 47/0885 366/130 |
| 2013/0341297 | A1 | 12/2013 | Stephan | |
| 2014/0119154 | A1 | 5/2014 | Kershaw | |
| 2014/0140163 | A1 | 5/2014 | Reay | |
| 2014/0192610 | A1 | 7/2014 | Holmes | |
| 2015/0289721 | A1 * | 10/2015 | Tucker | A47J 43/044 366/130 |
| 2015/0290605 | A1 | 10/2015 | Dayton | |

FOREIGN PATENT DOCUMENTS

| | | |
|---|---|---|
| WO | WO1997007724 A1 | 3/1977 |
| WO | WO2005011934 A2 | 2/2005 |
| WO | WO2014056079 A1 | 4/2014 |
| WO | WO2015157549 | 10/2015 |

* cited by examiner

WHISK MIXING SYSTEMS WITHIN A CONTAINER

RELATED APPLICATIONS

The present application is a continuation-in-part of U.S. patent application Ser. No. 14/847,963, filed Sep. 8, 2015 and entitled MIXING SYSTEMS AND METHODS.

TECHNICAL FIELD

The present invention relates to systems and methods for mixing ingredients. More specifically, the present invention relates to whisk systems to be retained in various containers to facilitate mixture of ingredients of the container.

BACKGROUND

There are many circumstances in which disparate ingredients are to be mixed together within a container. For example, various drinks, such as hot chocolate, baby formula, protein and nutritional supplements, and the like are made by mixing a powder with a liquid such as water. Further, some medicines, such as antacids, antibiotics, and the like are rendered in drinkable form by mixing a powder, gel, solid, or other soluble material with water or other liquids.

Unfortunately, existing mixing systems and methods tend to leave some ingredients unmixed. It is not uncommon, for example, to find clumps of undissolved formula in a baby bottle, even after vigorous shaking. The same can be said of many other mixing processes. The result is that the desired ratio of ingredients is not obtained, and some ingredients are wasted. Further, the process of cleaning a container after incomplete mixing can be somewhat more difficult.

SUMMARY OF THE INVENTION

The various systems and methods of the present invention have been developed in response to the present state of the art, and in particular, in response to the problems and needs in the art that have not yet been fully solved by currently available mixing systems and methods. The systems and methods of the present invention may provide mixing systems that provide more rapid and complete mixing, less unmixed residue, and/or an overall more enjoyable experience.

To achieve the foregoing, and in accordance with the invention as embodied and broadly described herein, enhanced mixing systems and methods may be provided for mixing ingredients in a container. Such a mixing system may include, in one embodiment, a container engagement component with one or more container engagement surfaces positioned to engage an interior of the container to keep the mixing system in place relative to the container, and a mixing component coupled to the container engagement component. The mixing component may have a shaft extending along an axis, and a plurality of rotatable mixing members arranged along the shaft. Each of the rotatable mixing members may have a plurality of rotatable mixing surfaces. The rotatable mixing members may be coupled to the shaft such that the rotatable mixing members are rotatable about the axis with the mixing system disposed within the container to cause the rotatable mixing surfaces to contact the ingredients in a manner that promotes mixture of the ingredients together.

Each of the rotatable mixing members may have a rotatable inner rim that engages the shaft in a manner that permits the rotatable inner rim to rotate about the shaft, and a plurality of rotatable vanes extending outward from the rotatable inner rim. Each rotatable vane may have a first rotatable mixing surface of the plurality of rotatable mixing surfaces. The first rotatable mixing surface may be oriented nonparallel and nonperpendicular to the axis such that motion of the ingredients along the axis induces rotation of each rotatable mixing member about the axis. Each rotatable vane of the plurality of rotatable vanes may terminate at a rotatable outer edge extending generally along a substantially straight line that, when viewed from along a radius passing through the rotatable outer edge and the axis, is oriented at an angle, relative to the axis, ranging from 30° to 60°.

The mixing component may further have a plurality of stationary mixing members, each of which is fixedly secured to the shaft. At least one of the rotatable mixing members may be positioned between and adjacent to two of the stationary mixing members. Each of the stationary mixing members may have a stationary inner rim fixedly secured to the shaft, and a plurality of stationary vanes extending outward from the stationary inner rim. Each stationary vane may have a first stationary mixing surface oriented nonparallel and nonperpendicular to the axis such that the first stationary mixing surface cooperates with the plurality of rotatable mixing surfaces to contact the ingredients in a manner that promotes mixture of the ingredients together. Each stationary vane may have a first window and a second window, each of which is shaped to define window mixing surfaces. The window mixing surfaces may facilitate mixture together of ingredients flowing through the first window and the second window.

Each rotatable vane may terminate at a rotatable outer edge extending generally along a first substantially straight line that, when viewed from along a first radius passing through the rotatable outer edge and the axis, is oriented at a first angle relative to the axis. Each stationary vane may terminate at a stationary outer edge extending generally along a second substantially straight line that, when viewed from along a second radius passing through the stationary outer edge and the axis, is oriented at a second angle relative to the axis. The second angle may be substantially equal and opposite to the first angle. At least one of the rotatable mixing members may be positioned in close proximity to two of the stationary mixing members such that during rotation of the rotatable mixing member, only narrow gaps exist between the rotatable vanes and the stationary vanes of the two of the stationary mixing members.

The container engagement component may have exterior threading, on which the container engagement surfaces are located, that mates with interior threading proximate an opening of the container. The exterior threading may be connected to the shaft by a plurality of webs that are integrally formed with the exterior threading and the shaft. The webs may be distributed about the axis to define a plurality of apertures through which the ingredients pass to move from the opening to the plurality of mixing members. The apertures may define a plurality of aperture mixing surfaces that further facilitate mixture together of ingredients flowing through the apertures. Each of the webs may have a plurality of fins projecting outward from the axis. Each of the fins may be oriented at an angle nonparallel and nonperpendicular to the axis to direct ingredients flowing between the fins and toward the opening to flow through the apertures.

According to one exemplary method for mixing ingredients within a container, a mixing system may be used, that has a container engagement component and a mixing component. The method may include inserting the mixing component and the container engagement component into the container. The mixing component may include a shaft extending along an axis, and a plurality of rotatable mixing members arranged along the shaft. Each of the rotatable mixing members may have a plurality of rotatable mixing surfaces. The method may further include engaging an interior of the container with one or more container engagement surfaces of the container engagement component. Further the method may include, with the mixing component disposed within the container, moving the container repetitively. In response to repetitive motion of the container, the rotatable mixing members may rotate about the axis. In response to rotation of the rotatable mixing members about the axis, the rotatable mixing surfaces may contact the ingredients in a manner that promotes mixture of the ingredients.

Each of the rotatable mixing members may have a rotatable inner rim that engages the shaft in a manner that permits the rotatable inner rim to rotate about the shaft, and a plurality of rotatable vanes extending outward from the rotatable inner rim. Each rotatable vane may have a first rotatable mixing surface of the plurality of rotatable mixing surfaces. The first rotatable mixing surface may be oriented nonparallel and nonperpendicular to the axis. Moving the container repetitively may include causing the ingredients to move along the axis to induce rotation of each rotatable mixing member about the axis.

The mixing component may further have a plurality of stationary mixing members, each of which is fixedly secured to the shaft. At least one of the rotatable mixing members may be positioned between and adjacent to two of the stationary mixing members. The method may further include, in response to repetitive motion of the container, contacting the ingredients with the stationary mixing members to further promote mixture of the ingredients.

Each of the stationary mixing members may have a stationary inner rim fixedly secured to the shaft, and a plurality of stationary vanes extending outward from the stationary inner rim. Each stationary vane may have a first stationary mixing surface oriented nonparallel and nonperpendicular to the axis. Contacting the ingredients with the stationary mixing members may include causing the first stationary mixing surface cooperates with the plurality of rotatable mixing surfaces to contact the ingredients in a manner that promotes mixture of the ingredients together.

Each stationary vane may have a first window and a second window, each of which is shaped to define window mixing surfaces. Contacting the ingredients with the stationary mixing members may further include causing the window mixing surfaces to facilitate mixture together of ingredients flowing through the first window and the second window.

Each rotatable vane may terminate at a rotatable outer edge extending generally along a first substantially straight line that, when viewed from along a first radius passing through the rotatable outer edge and the axis, is oriented at a first angle relative to the axis. Each stationary vane may terminate at a stationary outer edge extending generally along a second substantially straight line that, when viewed from along a second radius passing through the stationary outer edge and the axis, is oriented at a second angle relative to the axis. The second angle may be substantially equal and opposite to the first angle. Contacting the ingredients with the stationary mixing members may further include rotating the rotatable vanes of at least one of the rotatable mixing members in a manner that directs the ingredients toward the stationary vanes of at least one of the stationary mixing members.

At least one of the rotatable mixing members may be positioned in close proximity to two of the stationary mixing members. Rotating the rotatable mixing members about the axis may include causing only narrow gaps to exist between the rotatable vanes of one of the rotatable mixing members and the stationary vanes of two of the stationary mixing members that are adjacent to the one of the rotatable mixing members.

The container engagement component may have exterior threading on which the container engagement surfaces are located. Engaging the interior of the container with the container engagement surfaces may include mating the exterior threading with interior threading proximate an opening of the container.

The exterior threading may be connected to the shaft by a plurality of webs that are integrally formed with the exterior threading and the shaft. The webs may be distributed about the axis to define a plurality of apertures through which the ingredients pass to move from the opening to the plurality of mixing members. The apertures may define a plurality of aperture mixing surfaces. Each of the webs may have a plurality of fins projecting outward from the axis. Each of the fins may be oriented at an angle nonparallel and nonperpendicular to the axis to direct ingredients flowing between the fins and toward the opening to flow through the apertures. The method may further include directing a subset of the ingredients flowing between the fins and toward the opening to flow through the apertures, and contacting the subset of the ingredients with the aperture mixing surfaces to further facilitate mixture together of ingredients flowing through the apertures.

According to another embodiment, a mixing system may include a container engagement component with one or more container engagement surfaces positioned to engage an interior of the container to keep the mixing system in place relative to the container, and a mixing component coupled to the container engagement component. The mixing component may include a shaft extending along an axis, a plurality of rotatable mixing members arranged along the shaft, and a plurality of stationary mixing members arranged along the shaft. Each of the rotatable mixing members may have a rotatable inner rim that engages the shaft in a manner that permits the rotatable inner rim to rotate about the shaft, and a plurality of rotatable vanes extending outward from the rotatable inner rim. Each rotatable vane may have a first rotatable mixing surface oriented nonparallel and nonperpendicular to the axis such that motion of the ingredients along the axis induces rotation of each rotatable mixing member about the axis to cause the first rotatable mixing surface to contact the ingredients in a manner that promotes mixture of the ingredients together. Each of the stationary mixing members may have a stationary inner rim fixedly secured to the shaft, and a plurality of stationary vanes extending outward from the stationary inner rim. Each stationary vane may have a first stationary mixing surface oriented nonparallel and nonperpendicular to the axis such that the first stationary mixing surface cooperates with the plurality of rotatable mixing surfaces to contact the ingredients in a manner that promotes mixture of the ingredients together. Each rotatable vane may terminate at a rotatable outer edge extending generally along a first substantially straight line that, when viewed from along a first radius passing through the rotatable outer edge and the axis, is oriented at a first angle relative to the axis. Each stationary vane may terminate at a stationary outer edge extending generally along a second substantially straight line that, when viewed from along a second radius passing through the stationary outer edge and the axis, is oriented at a second angle relative to the axis. The first angle may be within the range of 30° to 60°. The second angle may be substantially equal and opposite to the first angle. Each stationary vane may have a window shaped to define window mixing surfaces that facilitate mixture together of ingredients flowing through the window. At least one of the rotatable mixing members may be positioned in close proximity to two of the stationary mixing members such that during rotation of the rotatable mixing member, only narrow gaps exist between the rotatable vanes and the stationary vanes of the two of the stationary mixing members.

These and other features and advantages of the present invention will become more fully apparent from the following description and appended claims, or may be learned by the practice of the invention as set forth hereinafter.

BRIEF DESCRIPTION OF THE DRAWINGS

Exemplary embodiments of the invention will become more fully apparent from the following description and appended claims, taken in conjunction with the accompanying drawings. Understanding that these drawings depict only exemplary embodiments and are, therefore, not to be considered limiting of the invention's scope, the exemplary embodiments of the invention will be described with additional specificity and detail through use of the accompanying drawings in which:

DETAILED DESCRIPTION

Exemplary embodiments of the invention will be best understood by reference to the drawings, wherein like parts are designated by like numerals throughout. It will be readily understood that the components of the invention, as generally described and illustrated in the Figures herein, could be arranged and designed in a wide variety of different configurations and made out of any of a wide variety of different materials, such as plastic, silicone, metal, stainless steel, aluminum and the like. Thus, the following more detailed description of the embodiments of the apparatus, system, and method, as represented in FIGS. 1 through 14, is not intended to limit the scope of the invention, as claimed, but is merely representative exemplary of exemplary embodiments of the invention.

The phrases "connected to," "coupled to" and "in communication with" refer to any form of interaction between two or more entities, including mechanical, electrical, magnetic, electromagnetic, fluid, and thermal interaction. Two components may be functionally coupled to each other even though they are not in direct contact with each other. The term "abutting" refers to items that are in direct physical contact with each other, although the items may not necessarily be attached together. The phrase "fluid communication" refers to two features that are connected such that a fluid within one feature is able to pass into the other feature.

The word "exemplary" is used herein to mean "serving as an example, instance, or illustration." Any embodiment described herein as "exemplary" is not necessarily to be construed as preferred or advantageous over other embodiments. While the various aspects of the embodiments are presented in drawings, the drawings are not necessarily drawn to scale unless specifically indicated.

Figure 1:
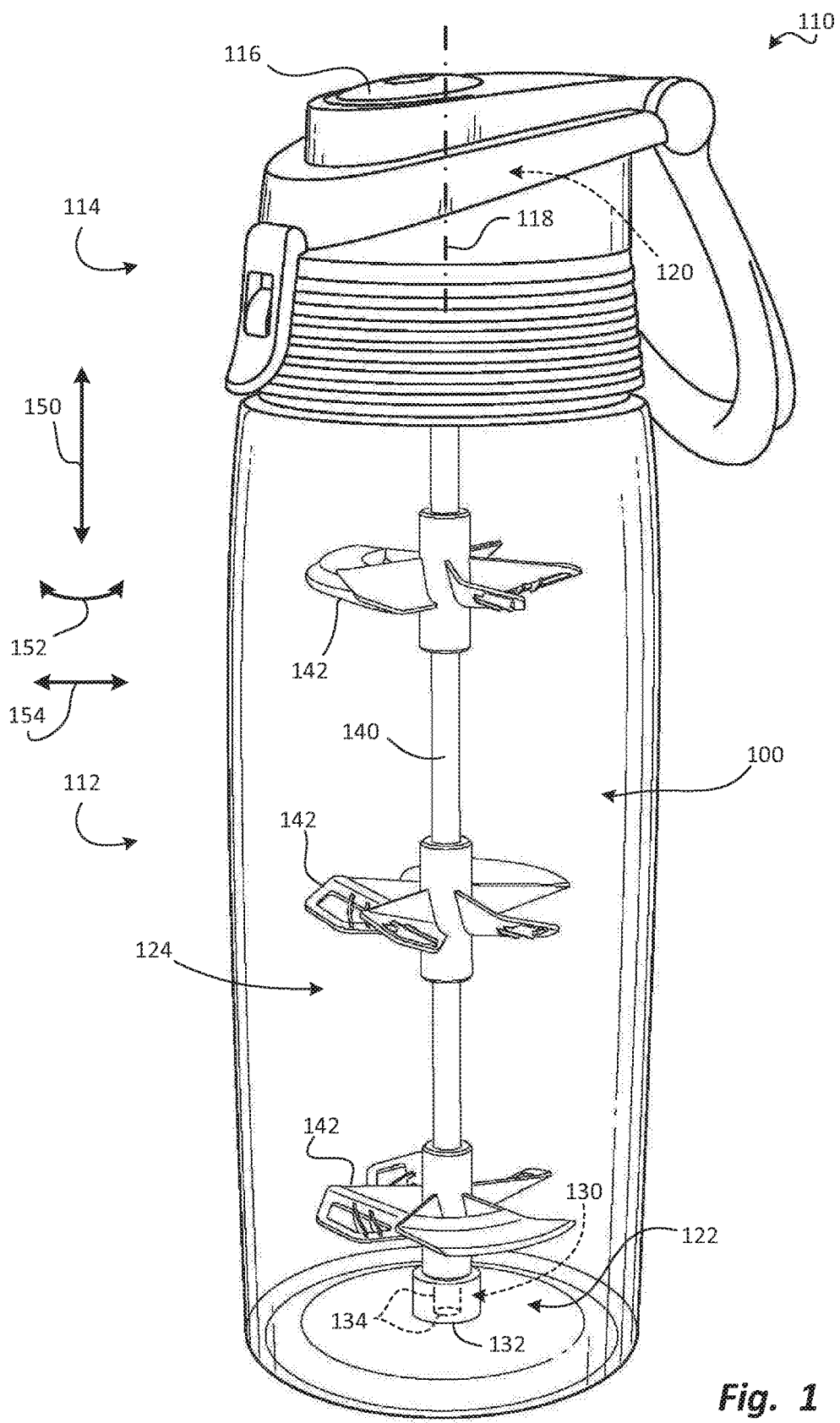
FIG. 1 is a perspective view of a mixing system positioned within a container, according to one embodiment.

Referring to FIG. 1, a perspective view illustrates a mixing system 100 according to one embodiment of the invention. The mixing system 100 is shown disposed within a container 110. The container 110 of FIG. 1 may be a shaker bottle commonly used for mixing fitness beverages such as protein drinks. However, the container 110 of FIG. 1 is merely exemplary; the various mixing systems and methods of the present disclosure may be used in connection with a wide variety of containers used to mix ingredients together. Such container types may include, but are not limited to, shaker bottles, baby bottles for formula or supplements, bottles containing medication to be mixed, bottles for mixing spirits, and the like.

The mixing system 100 may be designed to be contained entirely within the container 110. The container, in the embodiment of FIG. 1, may have a bottle portion 112 that contains the majority of the ingredients, and a cap portion 114 that provides selective containment and access of the ingredients. The cap portion 114 may have a drinking aperture 116 that may be used to directly imbibe the contents of the container 110. The drinking aperture 116 may be covered with a cover that keeps the ingredients in place within the container 110 when the user is not drinking from the container 110.

The container 110, or at least the bottle portion 112, may have general radial symmetry (but not necessarily complete radial symmetry) about an axis 118. The mixing system 100 may be positioned to extend along the axis 118. Some elements of the mixing system 100 may be radially symmetrical about the axis 118, while others may be made intentionally radially asymmetrical, as will be shown and described subsequently.

The mixing system 100 may have various components that cooperate to facilitate mixture of the ingredients of the container 110. Specifically, the mixing system 100 may have a first container engagement component 120, a second container engagement component 122, and a mixing component 124. The first container engagement component 120 and the second container engagement component 122 may cooperate to keep the mixing system 100 properly positioned and/or oriented within the container 110. The mixing component 124 may facilitate mixture of the ingredients together.

The first container engagement component 120 and the second container engagement component 122 may each retain one end of the mixing component 124. Specifically, the first container engagement component 120, which is not shown in FIG. 1, may couple the mixing component 124 to the cap portion 114 of the container 110. Similarly, the second container engagement component 122, which is visible through the transparent wall of the bottle portion 112, may couple the mixing component 124 to the bottle portion 112 of the container 110.

The first container engagement component 120 and the second container engagement component 122 may each have a cylindrical boss 130, which may be received in a tubular receiver 132 of the corresponding one of the bottle portion 112 and the cap portion 114. Each of the cylindrical bosses 130 may define a plurality of engagement surfaces 134, which may contact the corresponding parts of the container 110 (i.e., the tubular receivers 132) to keep the cylindrical bosses 130 in place, thereby keeping the mixing component 124 in place. The engagement surfaces 134 may include the cylindrical and circular surfaces defined by the generally cylindrical shape of the cylindrical bosses 130. The cylindrical boss 130 with engagement surfaces 134 is shown for the second container engagement component 122; the first container engagement component 120 may have a similar boss with engagement surfaces (not shown), which may be received in and contact a corresponding tubular receiver (not shown) in the cap portion 114 of the container 110.

The first container engagement component 120 and the second container engagement component 122 are merely exemplary. Although the mixing system 100 has two container engagement components, in other embodiments (not shown), only one container engagement component may be used. For example, the first container engagement component 120 or the second container engagement component 122 may be omitted in favor of a single-ended cantilever attachment by which the mixing system 100 is secured only its top end, to the cap portion 114, or at its bottom end, to the bottle portion 112.

Additionally or alternatively, in other embodiments (not shown), either of the first container engagement component 120 and the second container engagement component 122 may be omitted in favor of integration of the mixing system 100 with the bottle portion 112 and/or the cap portion 114 of the container 110. For example, the tubular receiver 132 that receives the boss of the second container engagement component 122 may be omitted, and the cylindrical boss 130 of the second container engagement component 122 may instead be formed as a single piece with the interior of the bottle portion 112 and/or permanently attached (for example, via bonding or welding) to the interior of the bottle portion 112. Additionally or alternatively, the tubular receiver 132 (not shown) of the first container engagement component 120 may be omitted, and the cylindrical boss 130 (not shown) of the first container engagement component 120 may be formed as a single piece with the cap portion 114 and/or permanently attached (for example, via bonding or welding) to the interior of the cap portion 114.

The mixing system 100 and the container 110 may be made specifically to work together (for example, by forming the tubular receivers 132 in the bottle portion 112 and in the cap portion 114 with the appropriate dimensions and spacing to receive the first container engagement component 120 and the second container engagement component 122). In alternative embodiments (not shown), a mixing system may have one or more container engagement components that are made to work with containers that are not specifically designed to receive and/or retain the mixing system. For example, a mixing system may have one or more engagement components that do not rely on specific mixing system engagement features of a container, but rather engage interior surfaces of the container that are present for other purposes, such as containment of the ingredients.

For example, such a container engagement component may engage the container in a variety of ways, including but not limited to mechanical fastening, adhesive or chemical bonding, thermal, friction, inertial, infrared, radio frequency, or other welding, and/or the like. In some embodiments (not shown), a container engagement component may be designed to expand to engage the interior diameter of a tubular or other shape having inwardly-oriented surfaces. Such an engagement component may be able to engage a container at multiple levels of expansion so that the resulting mixing system can be installed and securely retained in containers of a variety of sizes and/or shapes.

By way of further example, an alternative embodiment (not shown) of a mixing system for baby formula may have an expandable container engagement component that expands to engage the interior of the neck of the bottle. Such a mixing system may be usable in conjunction with baby bottles having a variety of neck sizes. The baby bottles may be conventional, and need not have any particular feature to receive and/or engage with the mixing system.

The mixing component 124 may have a shaft 140 and a plurality of mixing members 142. By way of example, the mixing component 124 of FIG. 1 has three mixing member 142. However, in other embodiments, a different number of mixing members may be used, including but not limited to one, two, four, or five, or more mixing members.

The container 110 may be repetitively moved in any of various patterns to cause the mixing component 124 to facilitate mixture of the ingredients together. For example, the user may shake the container 110 by repetitively moving the container 110 back and forth along the axis 118, as represented by the arrows 150. Additionally or alternatively, the user may shake the container 110 by causing the axis 118 of the container 110 to revolve about an arbitrary axis displaced from the axis 118, as indicated by the arrows 152. This motion may be akin to swirling the contents of a glass. Additionally or alternatively, the user may shake the container 110 linearly from side-to-side, as indicated by the arrows 154. The mixing component 124 may be designed such that mixing occurs as a result of any of these motion patterns.

Figure 2:
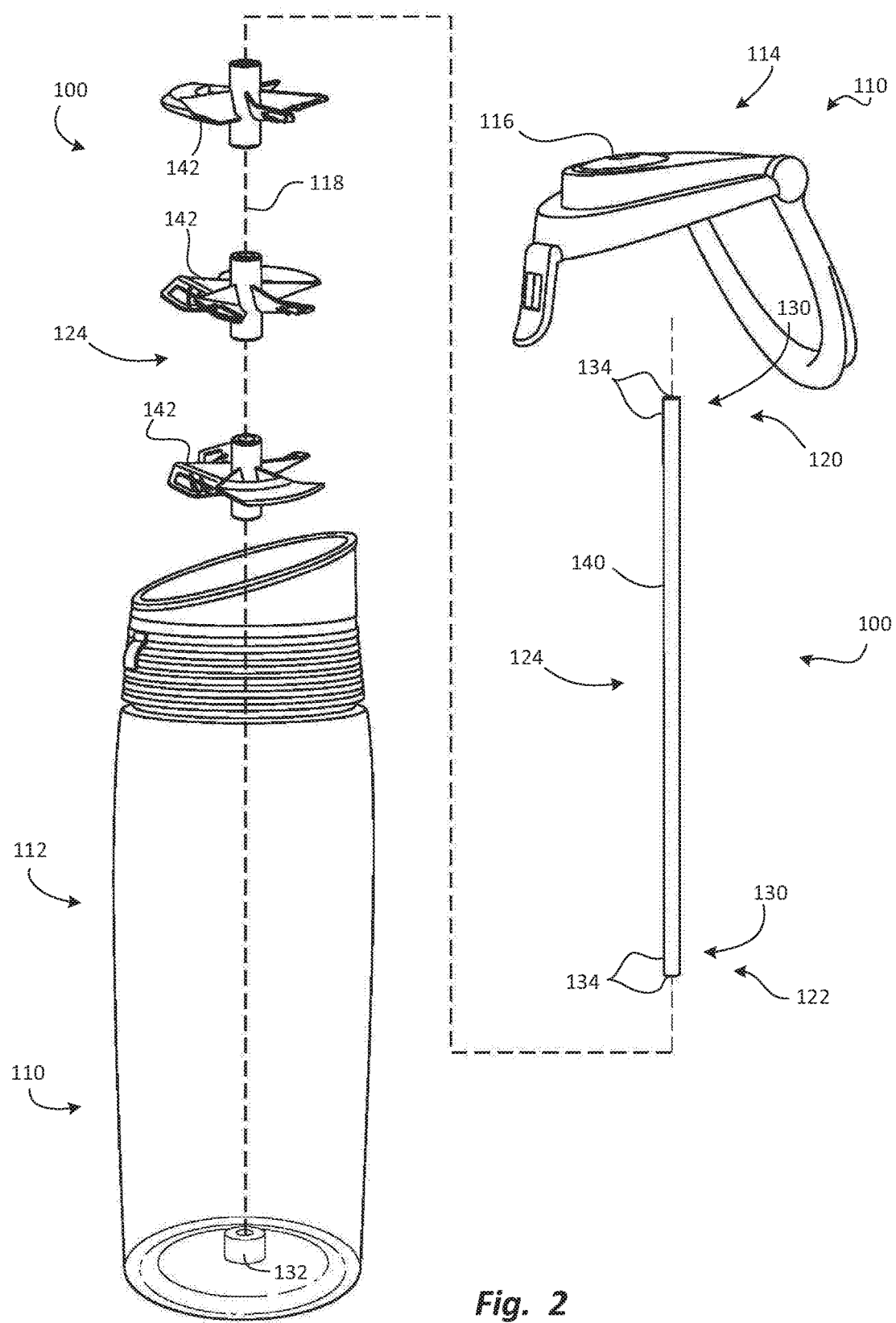
FIG. 2 is an exploded, perspective view of the mixing system and the container of FIG. 1.

FIG. 2 is an exploded, perspective view of the mixing system 100 and the container 110 of FIG. 1. The configuration and assembly of the various components of the mixing system 100 will be described in connection with FIG. 2.

The shaft 140 may have a generally cylindrical shape. The ends of the shaft 140 may define the cylindrical bosses 130 of the first container engagement component 120 and the second container engagement component 122. The shaft 140 may have a length selected to enable the shaft 140 to span the length of the interior of the container 110, from the interior of the bottom surface of the bottle portion 112, to the interior of the top surface of the cap portion 114. When the first container engagement component 120 and the second container engagement component 122 are coupled to the container 110, the shaft 140 may be positioned and oriented such that the axis of symmetry of the shaft 140 is collinear with the axis 118.

Each of the mixing members 142 may be freely slidable along and rotatable about the shaft 140 and the axis 118. The mixing members 142 may be designed to rotate about and/or slide along the axis 118 in response to repetitive motion of the container 110, such as that described previously and represented by the arrows 150 and the arrows 152 of FIG. 1. This motion of the mixing members 142 may cause mixing surfaces on the mixing members 142 to contact the ingredients in the container 110 in a manner that helps mix them together. The configuration and operation of the mixing members 142 will be shown and described in greater detail in connection with FIGS. 3 and 4.

If desired, the mixing system 100 may be sold along with the container 110, or as a separate unit. The shaft 140 and the mixing members 142 may be packaged in disassembled form so that the mixing system 100 occupies relatively little space. The mixing system 100 may then easily be assembled with the container 110. By way of example, this may be commenced by inserting the cylindrical boss 130 of the second container engagement component 122 (i.e., the bottom end of the shaft 140) into the tubular receiver 132 of the bottle portion 112 of the container 110. Then, the cylindrical boss 130 of the first container engagement component 120 (i.e., the top end of the shaft 140) may be inserted through the receiving apertures of each of the mixing members 142 until all of the mixing members 142 are rotatably coupled to the shaft 140. Then, the top end of the shaft 140 may be aligned with the tubular receiver 132 of the cap portion 114 of the container, and the cap portion 114 may be secured to the bottle portion 112 such that the cylindrical boss 130 of the first container engagement component seats within the tubular receiver 132 of the cap portion 114.

Notably, these steps may be carried out in a variety of sequences. For example, the cylindrical boss 130 of the first container engagement component 120 may first be inserted into the tubular receiver 132 of the cap portion 114. Alternatively, the mixing members 142 may first be inserted onto either end or both ends of the shaft 140, and then the first container engagement component 120 and the second container engagement component 122 may be inserted into the tubular receivers 132 of the container 110.

Figure 3:
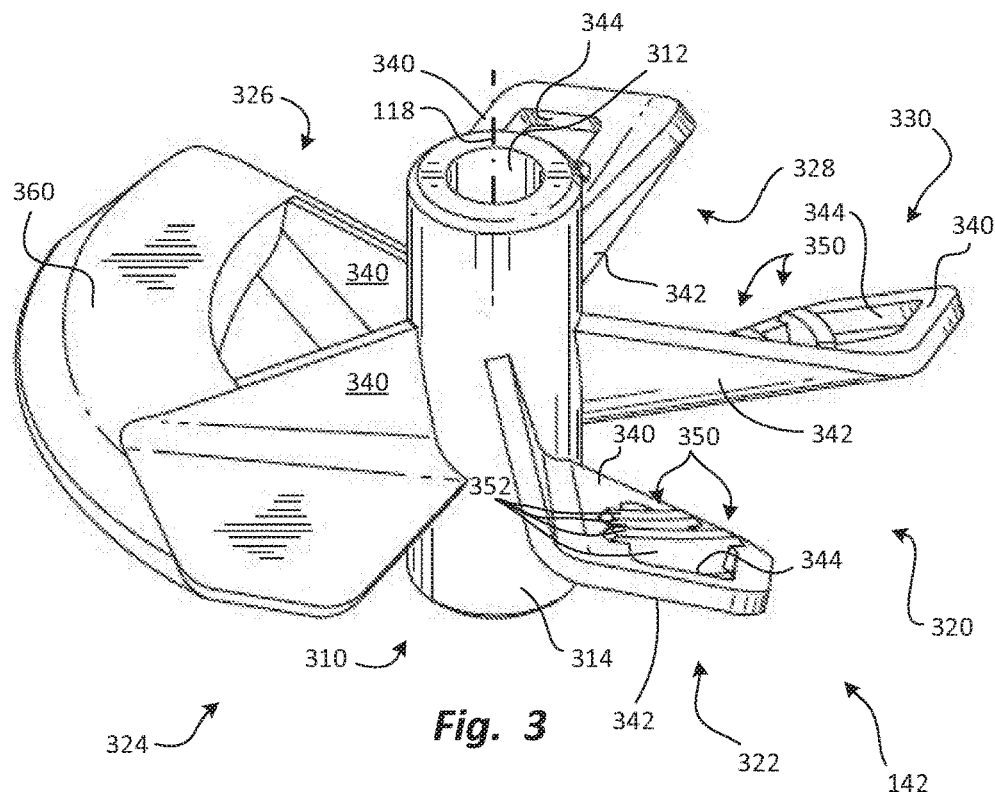
FIG. 3 is a perspective view of a mixing member of the mixing system of FIG. 1, in isolation.
Figure 4:
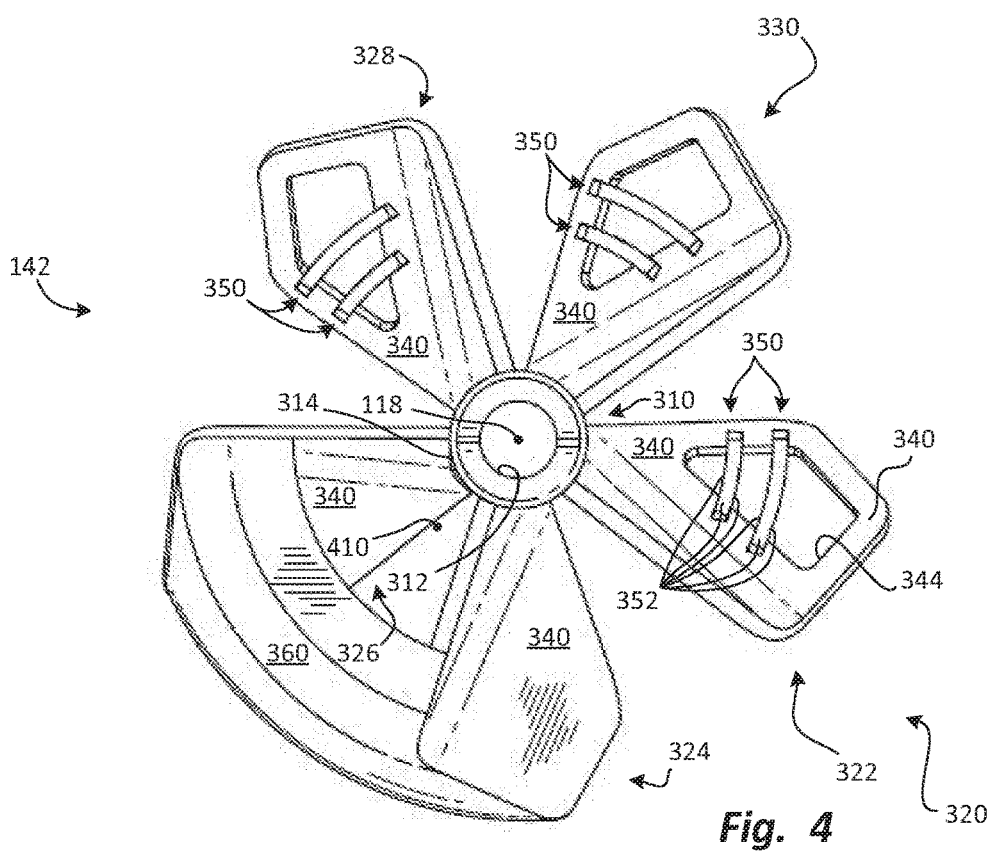
FIG. 4 is a plan view of a mixing member of the mixing system of FIG. 1, in isolation.

FIG. 3 is a perspective view of a mixing member 142 of the mixing system 100 of FIG. 1, in isolation. FIG. 4 is a plan view of a mixing member 142 of the mixing system 100 of FIG. 1, in isolation. The operation of the mixing members 142 will be further described in connection with FIGS. 3 and 4.

Each of the mixing members 142 may have an inner rim 310 with a generally tubular shape or any other shape having an interior surface 312 and an exterior surface 314. The interior surface 312 and the exterior surface 314 may both be generally cylindrical in shape. The interior surface 312 may be relatively smooth to facilitate rotation of the mixing member 142 about the shaft 140 and sliding of the mixing member 142 along the shaft 140. Each of the mixing members 142 may also have a plurality of vanes 320 that extend outward from the inner rim 310. The vanes 320 may generally have the shape of blades of a fan, and may thus cause each mixing member 142 to rotate about the shaft 140 in response to relative motion, parallel to the shaft 140, between the vanes 320 and the ingredients (and in particular, fluid ingredients) of the container 110.

The vanes 320 may include a first vane 322, a second vane 324, a third vane 326, a fourth vane 328, and a fifth vane 330. The vanes 320 may be distributed relatively evenly about the axis of the mixing member 142, or the axis of symmetry of the inner rim 310. Each of the vanes 320 may have a top mixing surface 340 and a bottom mixing surface 342 that faces away from the top mixing surface 340. Notably, the vanes 320 may be shaped such that each mixing member 142 can be installed with the top mixing surface 340 oriented toward the cap portion 114, or with the bottom mixing surface 342 oriented toward the cap portion 114. The operation of each mixing member 142 may be similar in both orientations.

In addition to the top mixing surface 340 and the bottom mixing surface 342, the vanes 320 of the mixing members 142 may be shaped to define additional mixing surfaces. A "mixing surface" is any surface (with any geometry) that contacts the ingredients of the container 110 in a manner that facilitates mixing. Generally, the speed at which the mixing members 142 cause the ingredients to mix may generally be proportional to the relative motion between the mixing members 142 and the ingredients, and to the surface area that is moving relative to the ingredients. The geometry of the mixing surfaces may also help determine the efficiency of mixing. Specifically, the presence of a larger number of mixing surfaces, sharp edges between intersecting mixing surfaces, and/or a larger overall surface area of mixing surfaces, may help to increase fluid shear, thereby expediting mixing.

The vanes 320 of the mixing members 142 may be shaped to promote mixing. Specifically, the top mixing surface 340 and the bottom mixing surface 342 of each of the vanes 320 may be separated from each other by a substantially uniform thickness. Each of the first vane 322, the fourth vane 328, and the fifth vane 330 may be shaped to define a window 344 through which the ingredients of the container 110 can pass. Each window 344, itself, may define mixing surfaces that contact the ingredients to further facilitate mixing.

Additionally, each of the mixing members 142 may have a plurality of bridging members 350 that span each of the windows 344. The bridging members 350 may each have a plurality of bridging member mixing surfaces 352 that further expedite mixing. Specifically, each of the bridging members 350 may have a rectangular cross sectional shape that provides additional edges where the bridging member mixing surfaces 352 intersect each other. These edges may further expedite mixing as the ingredients in the container 110 move through each of the windows 344.

In addition to the inner rim 310 and the vanes 320, each of the mixing members 142 may have a weight portion 360 that extends between the distal ends of the second vane 324 and the third vane 326. The weight portion 360 may be integrally formed with the second vane 324 and the third vane 326, if desired. The weight portion 360 may have a geometry selected such that the weight portion 360 has significant mass. The mass of the weight portion 360 may cause the mixing member 142 to have a center of gravity 410 that is significantly offset from the axis 118, as shown by way of example in FIG. 4. This eccentric weighting may enhance rotation of the mixing members 142 about the axis 118 in response to repetitive motion of container 110 described above, as represented by the arrows 152 and the arrows 154.

Further, the eccentric weighting (and the overall weight of the mixing members 142) may cause the mixing members 142 to rotate, in response to the repetitive motion, with force sufficient to overcome the effects of fluid drag that will be induced by motion of the mixing members 142 through the ingredients. Thus, the mixing members 142 may be well-suited to the mixture of relatively viscous ingredients. If desired, the mixing members 142 may be made of a relatively dense material such as a metal to enhance their mass, and thence, their angular momentum. Conversely, the shaft 140 may be formed of a lighter, less expensive material such as a plastic.

The configuration of the mixing members 142 of FIGS. 3 and 4 is merely exemplary. In alternative embodiments (not shown), mixing members of a wide variety of shapes and sizes may be used. For example, in some embodiments, the mixing members may be formed of alternative materials such as plastics, ceramics, and composite materials.

Further, in some embodiments (not shown), mixing members may have different geometries. For example, a different number of vanes may be used, such as one, two, three, four, six, seven, eight, nine, or ten. Windows of varying number and shape may be used; for example, each vane may have multiple windows. Windows may optionally be formed in vanes that connect to one or more weight portions. Each window may be spanned by any number of bridging members, including but not limited to zero, one, three, four, and five bridging members. Yet further, intersecting bridging members may be used, such as lattice structures and the like. Bridging members may have a wide variety of cross sectional shapes besides the rectangular cross sectional shape mentioned previously.

In alternative embodiments (not shown), various weight portion configurations may be used. If desired, a weight portion may be coupled to only one vane, or to three or more of the vanes. In the alternative to using an integrated weight portion, a weight portion may be formed separately from the vanes and attached to one or more of the vanes, for example, via fastening, bonding, welding, or the like. As another example, one or more vanes may be made heavier than the others, for example, by making them thicker, longer, and/or wider than the other vanes. Such heavier vanes may function in place of a discrete weight portion by providing eccentric weighting.

Further, in alternative embodiments (not shown), the mixing members 142 may not be freely slidable along the shaft 140. Rather, the mixing members 142 may be rotatable about the shaft 140, but fixed to specific positions on the shaft 140. This may be accomplished through the use of registration features such as ridges and grooves formed in the interior surface 312 of the inner rim 310 and/or in the exterior of the shaft 140. By way of example, such registration features may snap into engagement with each other when the mixing members 142 are pushed to the proper locations on the shaft 140 so that the mixing members 142 stay at their desired locations on the shaft 140. Thus, in fully-assembled form, the mixing members may remain spaced apart as shown in FIG. 1, rather than falling to the bottom of the bottle portion 112 of the container 110.

Yet further, in alternative embodiments (not shown), the mixing members 142 may be slidable along the shaft 140, but may be spaced apart from each other so that the mixing members maintain a desired minimum spacing between them. This may be accomplished through the use of inner rims with elongated shapes that provide the desired spacing, or the like.

Still further, in alternative embodiments (not shown), it may be desirable to have one or more of the mixing members rotate along a direction different from the rotation directions of other mixing members. For example, where there are three mixing members, the mixing member in the middle may have vanes that are oriented so that the middle mixing member rotates in a direction opposite to that of the mixing members above and/or below it. Such differential rotation may increase fluid shear, thereby expediting mixing. Those of skill in the art will recognize that a wide variety of alternative embodiments besides those specifically enumerated herein, may be effected with the aid of the present disclosure.

Referring again to the mixing system 100 of FIGS. 1 through 4, the mixing members 142 may be retained and/or actuated in various ways, different from those set forth in FIGS. 1 through 4. For example, the mixing members 142 may be secured to a shaft, and the shaft may be urged to rotate within the container. Alternatively, the mixing members 142 may be rotatably coupled to the shaft, but the shaft may have a non-circular cross-sectional shape with different container engagement components. Examples of these embodiments will be shown and described in connection with FIGS. 5 through 7, as follows.

Figure 5:
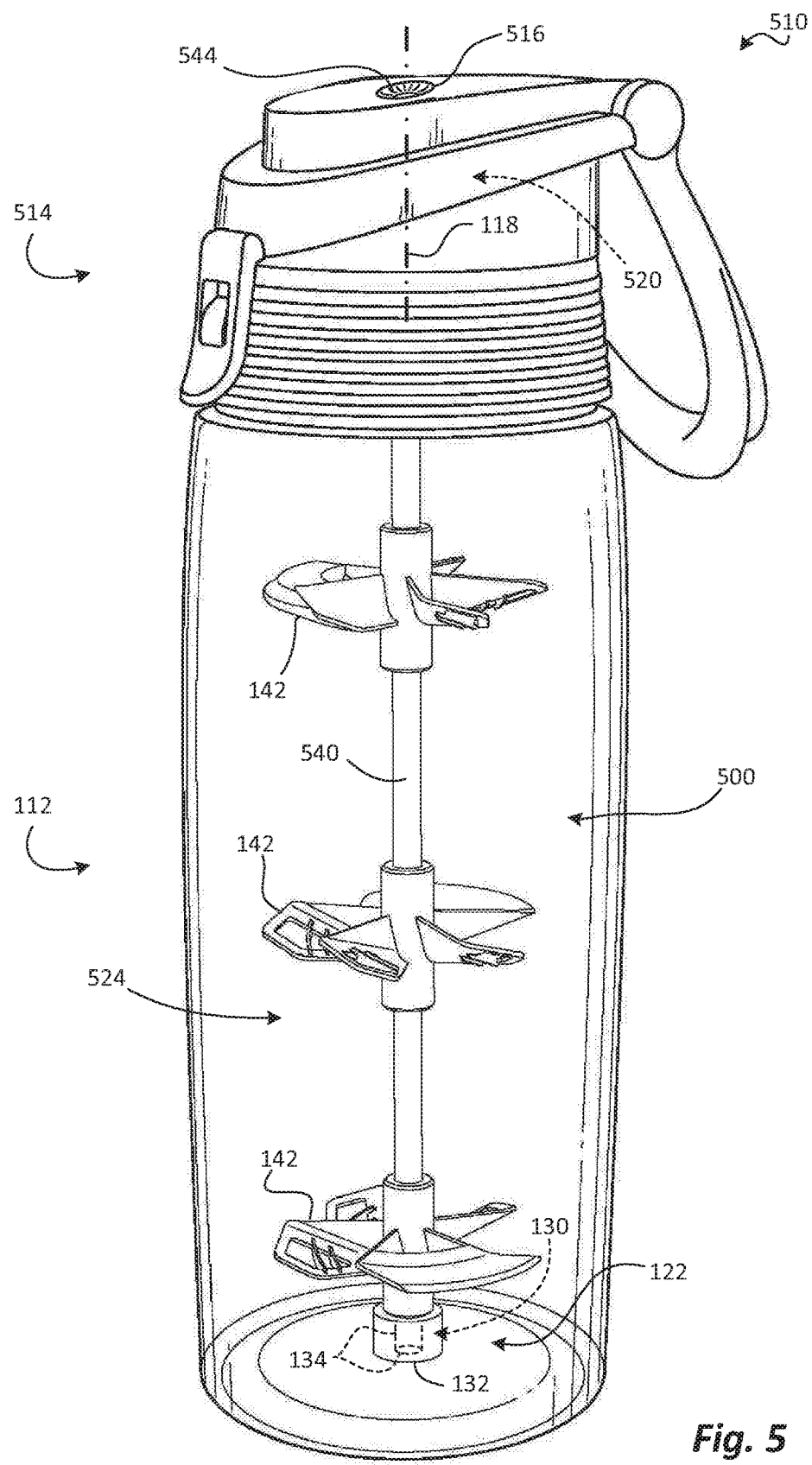
FIG. 5 is a perspective view of a mixing system positioned within a container, according to still another alternative embodiment.

Referring to FIG. 5, a perspective view illustrates a mixing system 500 positioned within a container 510, according to still another alternative embodiment. Components of the mixing system 500 and container 510 with the same numbers as those of the mixing system 100 and container 110 of FIGS. 1 through 4 may similar or identical to their counterparts of FIGS. 1 through 4.

The container 510 may have a bottle portion 112 like that of FIGS. 1 through 4, and a cap portion 514 that facilitates manual actuation of the mixing system 500. Specifically, the cap portion 514 may have an actuation aperture 516 aligned with the axis 118 of the container 510. The actuation aperture 516 may be sized such that the tip of a digit (a finger or thumb) of the user can be inserted through the actuation aperture 516 and used to actuate the mixing system 500, as will be set forth below.

As shown, the mixing system 500 may have a first container engagement component 520 (not visible in FIG. 5), a second container engagement component 122, and a mixing component 524. The mixing component 524 may have a shaft 540 and a plurality of mixing members 142 that are rigidly attached to the shaft 540. The shaft 540 may be rotatably coupled to the container 510 via the first container engagement component 520 and the second container engagement component 122.

An actuation interface 544 may be secured to the end of the shaft 540, and may be positioned adjacent to the actuation aperture 516. The actuation interface 544 may be recessed within the profile of the cap portion 514, or may be flush with the profile of the cap portion 514, so that the actuation interface 544 does not protrude from the cap portion 514. As embodied in FIG. 5, the actuation interface 544 may have the shape of a concave dome that extends into the interior of the cap portion 514, and provides ready contact with a sizable surface area of the user's digit when the digit is inserted into the actuation aperture 516.

Thus, the user can easily insert the tip of a thumb or finger through the actuation aperture 516 and into contact with the actuation interface 544. The user may then rotate the thumb or finger about the axis 118 to induce rotation of the mixing component 524 about the axis 118. Since the mixing members 142 are fixedly attached to the shaft 540, rotation of the actuation interface 544 may cause rotation of the shaft 540, thereby causing rotation of the mixing members 142 about the axis 118.

The second container engagement component 122 may have the same configuration as that of FIGS. 1 through 4. However, the first container engagement component 520 may have a different configuration. More particularly, the first container engagement component 520 may be shaped to rotatably retain the upper end of the shaft 540 such that the upper end of the shaft 540 passes through the first container engagement component 520, leaving the actuation interface 544 exposed.

In alternative embodiments, various actuation interfaces may be used. Such actuation interfaces may be shaped differently from the concave shape of the actuation interface 544 of FIG. 5. In some embodiments, an actuation interface may protrude from the container for easier and/or different access and/or actuation. Further, in some embodiments, the mixing members 142 may be slidably, but not rotatably, coupled to the shaft 540. For example, the mixing members 142 may be able to slide along the shaft 540, but may not be capable of rotating relative to it. Such a coupling may be obtained through the use of a splined interface or the like.

Figure 6:
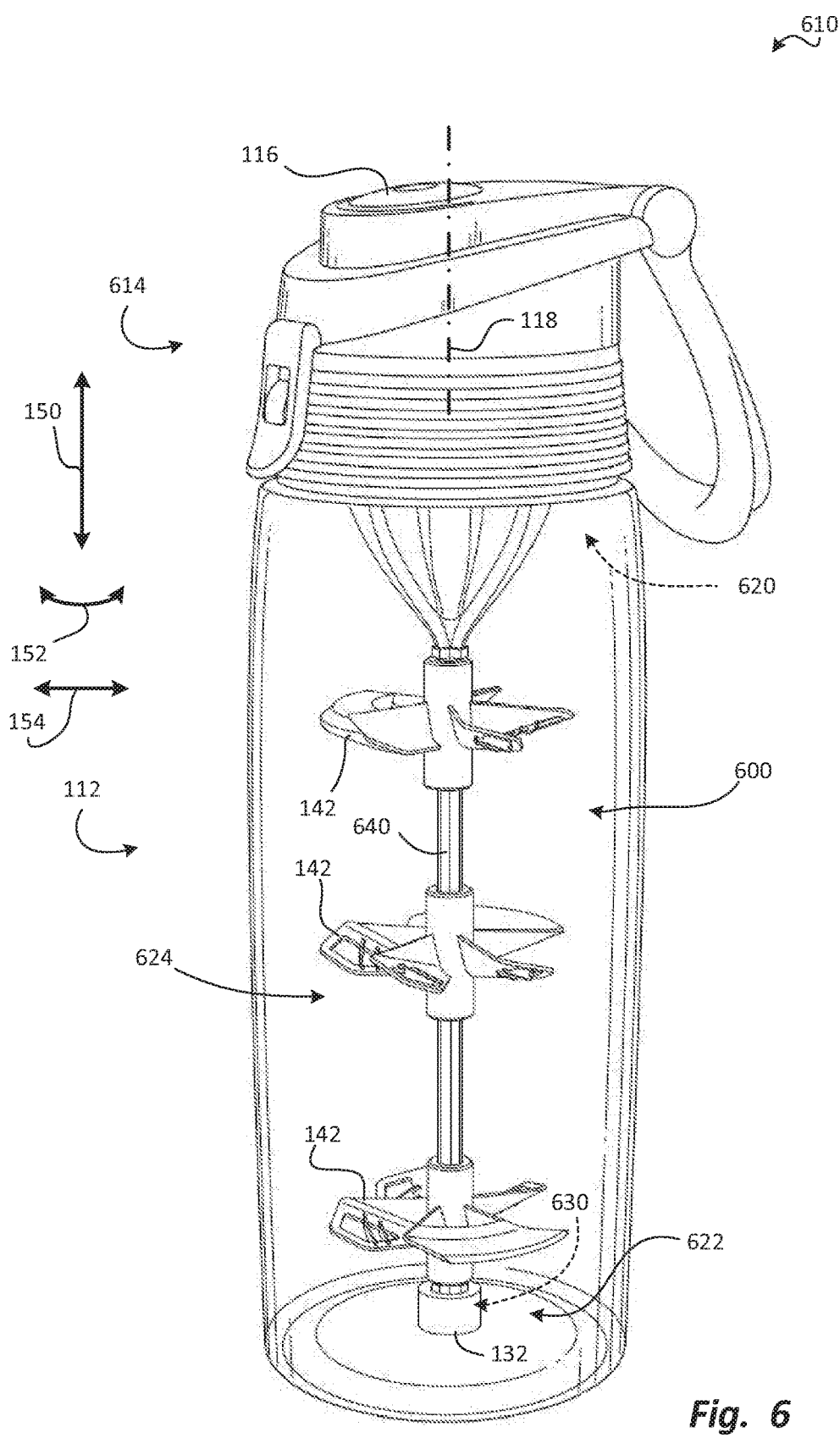
FIG. 6 is a perspective view of a mixing system positioned within a container according to yet another alternative embodiment.

Referring to FIG. 6, a perspective view illustrates a mixing system 600 positioned within a container 610 according to yet another alternative embodiment. Components of the mixing system 600 and container 610 with the same numbers as those of the mixing system 100 and container 110 of FIGS. 1 through 4 may similar or identical to their counterparts of FIGS. 1 through 4.

The mixing system 600 may be retained within the container 610 in a manner different from those of the mixing system 100 of FIGS. 1 through 4 and the mixing system 500 of FIG. 5. As shown, the container 610 may have a bottle portion 112 and a cap portion 614. The mixing system 600 may have a first container engagement component 620 (not visible in FIG. 6), a second container engagement component 622, and a mixing component 624.

The mixing component 624 may have a shaft 640 and a plurality of mixing members 142 that are rotatably and slidably attached to the shaft 640, like the mixing members 142 of the mixing system 100 of FIGS. 1 through 4. Thus, like the mixing system 100 of FIGS. 1 through 4, the mixing system 600 may be designed such that the mixing members 142 slide and/or rotate along the shaft 640 in response to repetitive motion of the container 610. This repetitive motion may be in the direction indicated by the arrows 150, the arrows 152, and/or the arrows 154, as described in connection with FIG. 1.

The shaft 640 may be secured to the container 610 via the first container engagement component 620 and the second container engagement component 622. The shaft 640 of the mixing component 624 of the mixing system 600 may have a splined cross-sectional shape. The splined cross-sectional shape may have a number of splines that are arranged in radially symmetrical fashion around the axis 118. In the exemplary embodiment shown in FIG. 6, the shaft 640 may have three splines that protrude outward from the axis 118. The configuration of the shaft 640 will be shown in greater detail in FIG. 7.

The splined cross-sectional shape may provide a reduced-friction interface with the mixing members 142, thereby facilitating and/or expediting relative rotation and/or sliding motion between the mixing members 142 and the shaft 640. The resulting enhanced motion of the mixing members 142 may facilitate and/or expedite mixture of the ingredients within the container 610.

The second container engagement component 622 may have a configuration similar to that of the second container engagement component 122. A tubular receiver 132 on the bottle portion 112 may receive a boss 630 at the lower end of the shaft 640. However, unlike the cylindrical bosses 130 of the shaft 140 of the mixing system 100 of FIGS. 1 through 4, the boss 630 may have a splined shape similar to that of the cross-sectional shape of the shaft 640. The boss 630 may, for example, have a similar, but enlarged cross-sectionals shape, with engagement surfaces 634 (shown in FIG. 7) that engage the interior of the 132. The first container engagement component 620 may be different from the first container engagement component 120 of the mixing system 100 of FIGS. 1 through 4, and may utilize a threaded connection to the cap portion 614, as will be shown and described in connection with FIG. 7.

Figure 7:
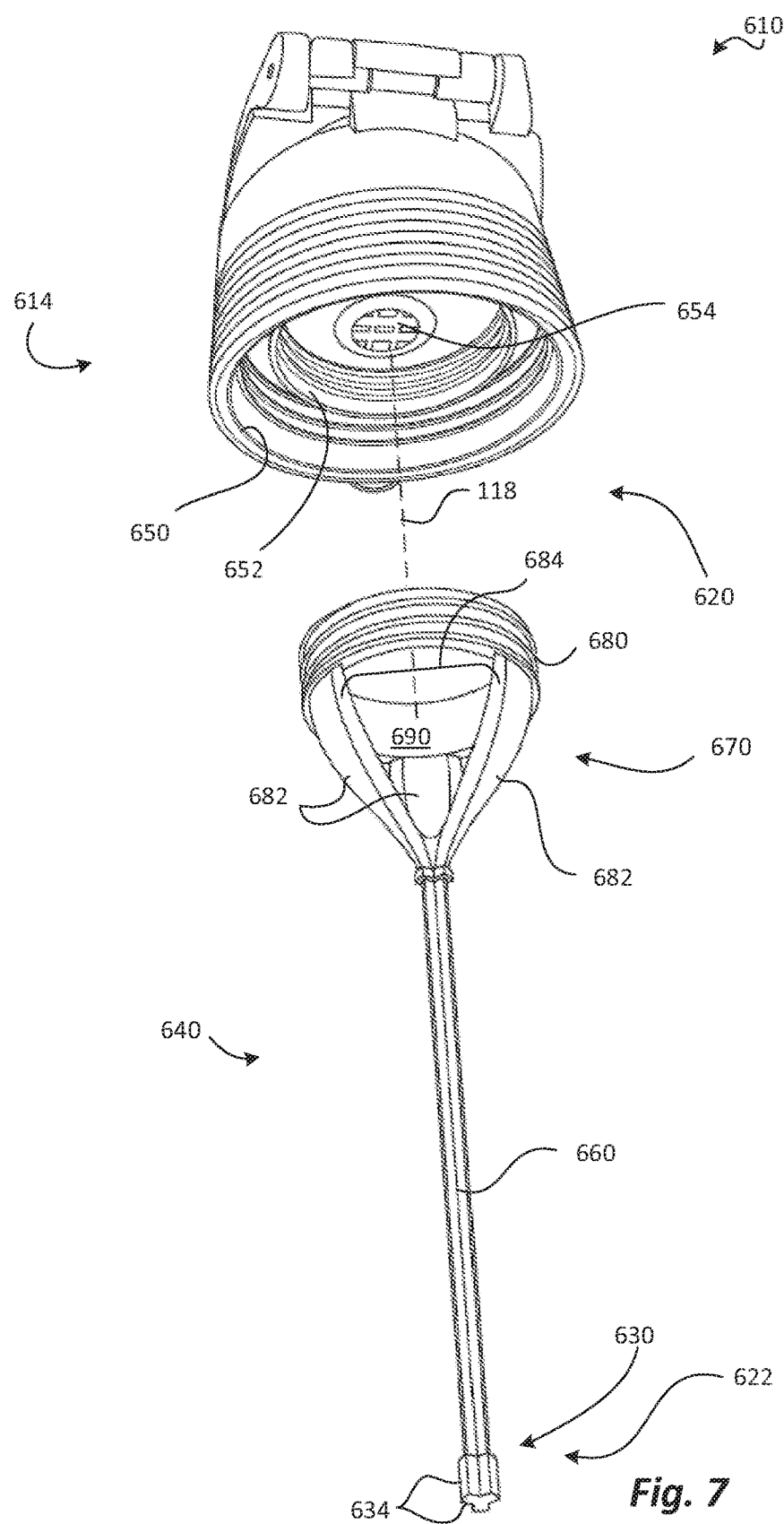
FIG. 7 is an exploded, perspective view of the shaft of the mixing system and the cap of the container of FIG. 6.

Referring to FIG. 7, an exploded, perspective view illustrates the shaft 640 of the mixing system 600 and the cap portion 614 of the container 610 of FIG. 6. As shown, the cap portion 614 may have an outer rim 650, an inner rim 652, and an aperture 654. The outer rim 650 may be threaded on its interior to receive corresponding threads (not shown) on the neck portion of the bottle portion 112. The inner rim 652 may also be threaded on its interior to permit the upper end of the shaft 640 to be threaded into engagement with the inner rim 652, and thence secured to the cap portion 614. The aperture 654 may permit the ingredients to flow into and/or out of the bottle portion 112 through the cap portion 614.

The shaft 640 may have a central portion 660 and a flared upper end 670 at which the diameter of the shaft 640 expands relative to that of the central portion 660. The flared upper end 670 may have a rim 680 and a plurality of arms 682 that connect the rim 680 to the central portion 660. The arms 682 may be spaced apart to leave gaps 684 between the arms 682, through which the ingredients can flow into an interior 690 of the flared upper end 670 from the remainder of the interior of the bottle portion 112, or from the interior 690 of the flared upper end 670 to the remainder of the interior of the bottle portion 112.

The rim 680 may have exterior threads sized to engage the interior threads of the inner rim 652 of the cap portion 614. Thus, the shaft 640 may be easily secured to the cap portion 614 by rotating the shaft 640 relative to the cap portion 614 about the axis 118 with the rim 680 of the shaft 640 abutting the inner rim 652, so that the exterior threads of the rim 680 engage the interior threads of the inner rim 652. The cap portion 614 may then be threaded into engagement with the bottle portion 112 by rotating the cap portion 614 and the shaft 640 relative to the bottle portion 112 about the axis 118 with the outer rim 650 abutting the neck portion of the bottle portion 112. This may cause the boss 630 of the second container engagement component 622 to seat in the tubular receiver 132 of the bottle portion 112. Thus, both ends of the shaft 640 may be secured relative to the container 610.

The shaft 640 may optionally be inserted through the inner rims 310 of the mixing members 142 prior to attachment of the shaft 640 to the cap portion 614. If desired, the boss 630 may optionally be made as a separate piece from the central portion 660 of the shaft 640. The boss 630 may be detachably or permanently secured to the lower end of the central portion 660 after insertion of the mixing members 142 onto the central portion 660 so that the boss 630 then acts to retain the mixing members 142 on the central portion 660.

The operation of the mixing system 600 may then be similar to that of the mixing system 100, as described in connection with FIGS. 1 through 4. The user may agitate, shake, and/or otherwise repetitively move the container 610 in the direction of the arrows 150, the arrows 152, and/or the arrows 154 to cause the mixing members 142 to rotate about the axis 118 and/or slide along the axis 118. This motion of the mixing members 142 may cause the various mixing surfaces of the mixing members 142 to contact the ingredients within the bottle portion 112 of the container 610, thereby facilitating mixing. Mixed ingredients may be imbibed or poured from the container 610 by opening the drinking aperture 116 of the cap portion 614 and tipping the container 610 so that the ingredients flow into the interior 690 of the upper end 670 from the remainder of the interior space within the bottle portion 112 of the container 610. The ingredients may then flow from the interior 690 through the aperture 654 and out of the cap portion 614 through the drinking aperture 116.

Various combinations of mixing members, shafts, container engagement components, and/or other components may be used in addition to or in place of those set forth in FIGS. 1 through 7 above. Another example will be shown and described in connection with FIGS. 8 through 14, as follows.

Figure 8:
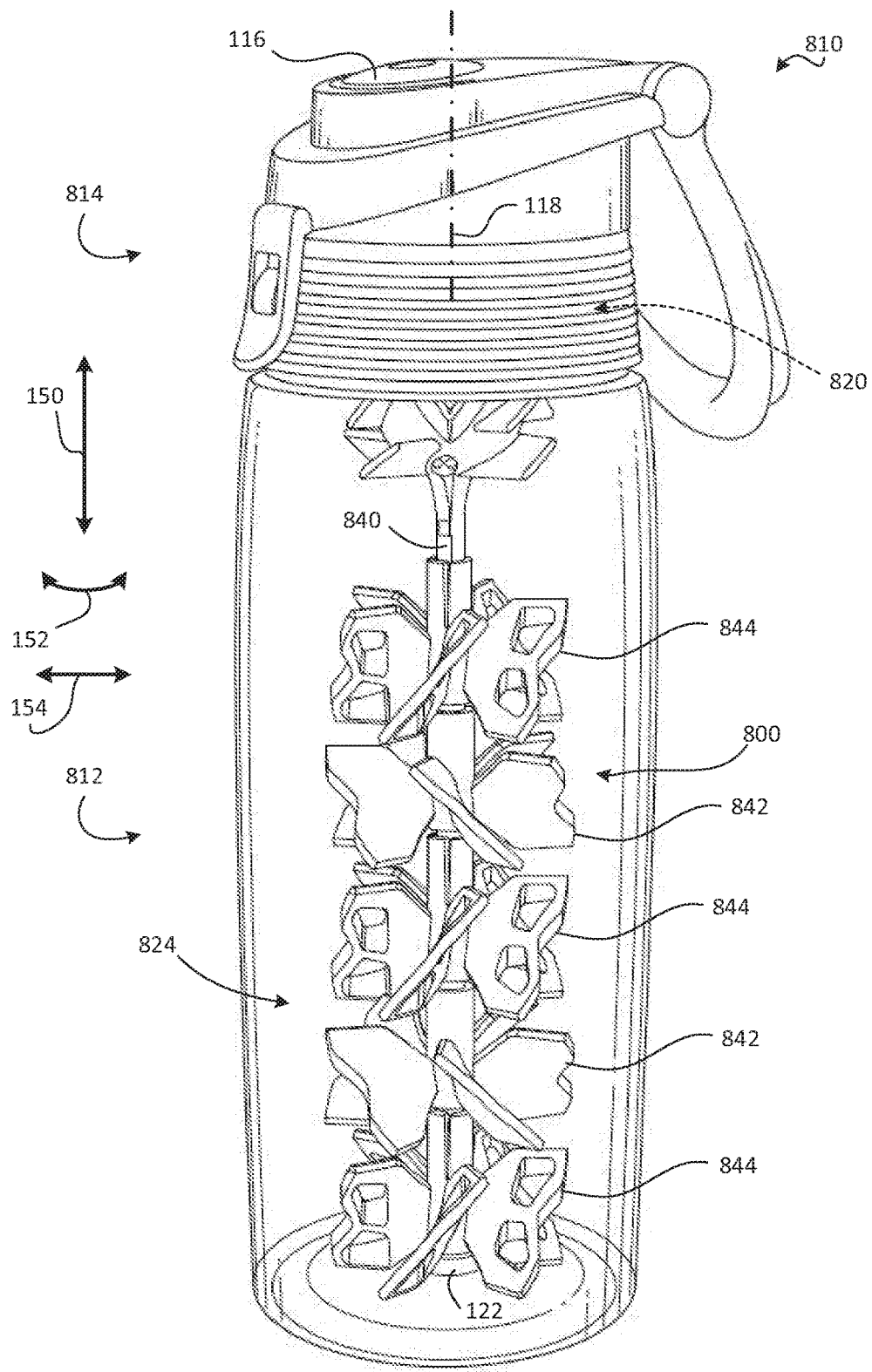
FIG. 8 is a perspective view depicting a mixing system positioned within a container, according to still another alternative embodiment.

Referring to FIG. 8, a perspective view illustrates a mixing system 800 positioned within a container 810, according to still another alternative embodiment. Components of the mixing system 800 and container 810 with the same numbers as those of the mixing system 100 and container 110 of FIGS. 1 through 4 may similar or identical to their counterparts of FIGS. 1 through 4. The container 110 may have a bottle portion 812 and a cap portion 814.

As shown, the mixing system 800 may have a first container engagement component 820 (not visible in FIG. 8), a second container engagement component 122, and a mixing component 824. The first container engagement component 820 and the second container engagement component 122 may cooperate to keep the mixing system 800 properly positioned and/or oriented within the container 810.

Specifically, the first container engagement component 820 may couple the mixing component 824 to the cap portion 814 of the container 110. Similarly, the second container engagement component 122, which is visible through the transparent wall of the bottle portion 812, may couple the mixing component 124 to the bottle portion 112 of the container 110. The second container engagement component 122 may have a configuration and operation similar to those of the second container engagement component 122 of FIGS. 1 through 4.

The mixing component 824 may have a shaft 840, a plurality of rotatable mixing members 842 that are rotatably coupled to the shaft 840, and a plurality of stationary mixing members 844 that are fixedly secured to the shaft 840. The shaft 840 may be fixedly secured to the first container engagement component 820, and indeed, may be formed as a single, unitary piece with the first container engagement component 820.

The container 810, or at least the bottle portion 812, may have general radial symmetry (but not necessarily complete radial symmetry) about an axis 118. The mixing system 800 may be positioned to extend along the axis 118. The shaft 840, the rotatable mixing members 842, and the stationary mixing members 844 may each be radially symmetrical about the axis 118.

Like the container 110, the container 810 may be repetitively moved in any of various patterns to cause the mixing component 824 to facilitate mixture of the ingredients together. For example, the user may shake the container 810 by repetitively moving the container 110 back and forth along the axis 118, as represented by the arrows 150, shake the container 110 by causing the axis 118 of the container 810 to revolve about an arbitrary axis displaced from the axis 118, as indicated by the arrows 152, and/or shake the container 810 linearly from side-to-side, as indicated by the arrows 154. The mixing component 824 may be designed such that mixing occurs as a result of any of these motion patterns. The configuration and operation of the mixing component 824 will be shown and described in further detail in connection with FIGS. 9 through 14, as follows.

Figure 9:
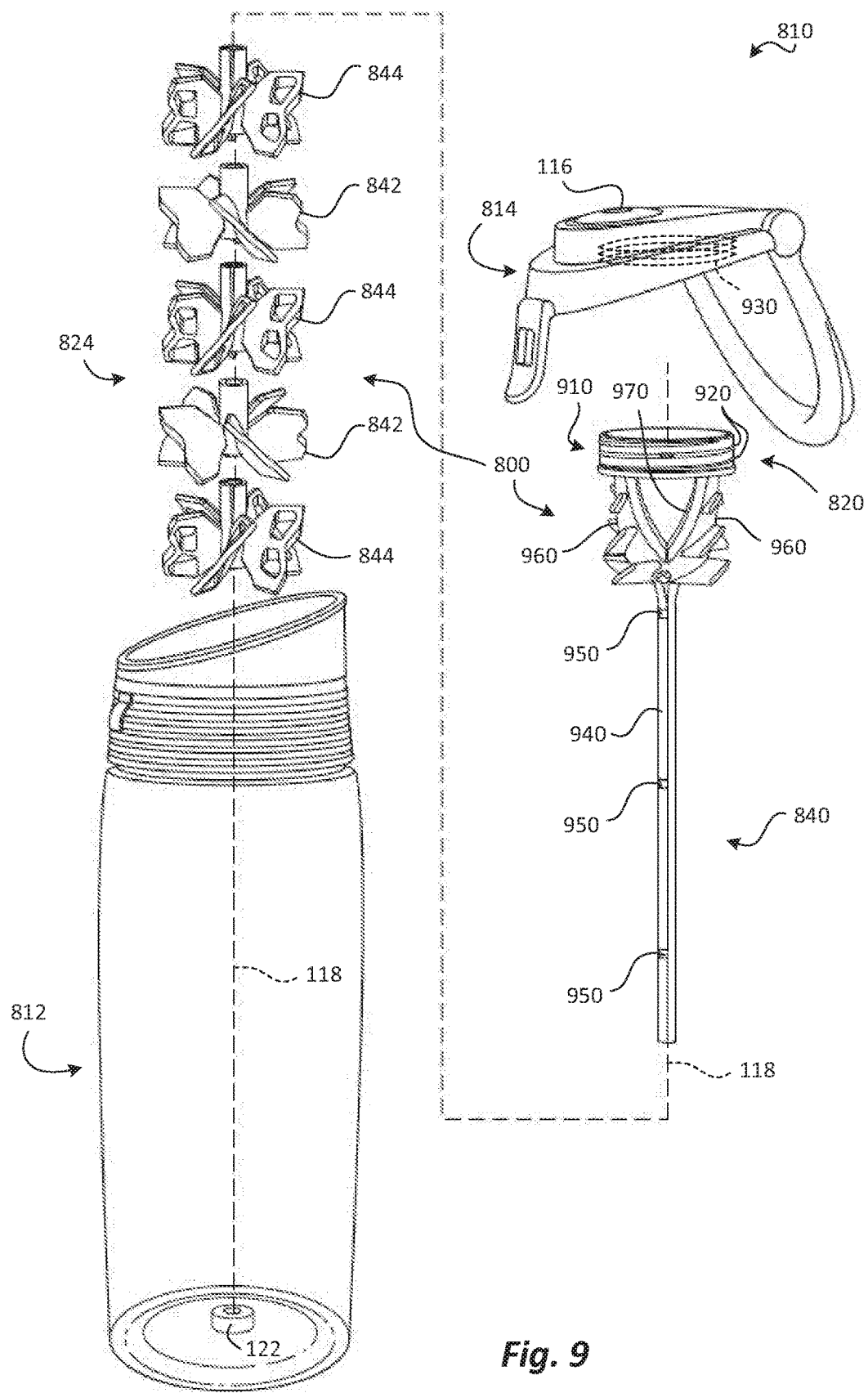
FIG. 9 is a perspective view depicting the mixing system of FIG. 8 in an exploded configuration.

Referring to FIG. 9, a perspective view illustrates the mixing system 800 of FIG. 8, in an exploded configuration. As shown, the mixing system 800 may have two of the rotatable mixing members 842 and three of the stationary mixing members 844. The rotatable mixing members 842 and the stationary mixing members 844 may be positioned along the shaft 840 in an alternating arrangement such that each of the rotatable mixing members 842 is positioned between two of the stationary mixing members 844. This arrangement may help mix the ingredients together by enhancing fluid shear as the fluid moves between the rotating rotatable mixing members 842 and the stationary mixing members 844. If desired, the rotatable mixing members 842 and the stationary mixing members 844 may be positioned in close proximity to each other, as depicted in FIG. 8, such that only a narrow gap exists between each end of each of the rotatable mixing members 842 and the near end of the adjacent stationary mixing member 844.

As further depicted in FIG. 9, the first container engagement component 820 may have a generally tubular configuration with exterior threading 910 that protrudes outward, away from the axis 118. The exterior threading 910 may define a plurality of container engagement surfaces 920 that contact the container 810 to retain the mixing system 800 relative to the container 810. The container engagement surfaces 920 may be, for example, the protruding surfaces of the exterior threading 910. The exterior threading 910 may mate with interior threading 930 of the cap portion 814. The interior threading 930 may be formed into the interior surface of the cap portion 814, and may protrude inwardly (i.e., toward the axis 118). Thus, the upper end of the mixing system 800 may be coupled to the cap portion 814 by threading the exterior threading 910 of the first container engagement component 820 into the interior threading 930 of the cap portion 814. In alternative embodiments, the bottle portion 812, rather than the cap portion 814, may have interior threading (not shown) that mates with the exterior threading 910 of the first container engagement component 820.

The exterior threading 910 represents only one of many engagement mechanisms that may be used to couple a mixing system to the interior of a container, according to the present disclosure. In other embodiments (not shown), various mechanical attachment features, chemical bonds, adhesive bonds, and/or the like may be used to couple a mixing system to a container. In other alternative embodiments, one or more components of a mixing system may be formed as a single piece with one or more components of a container. For example, in an alternative embodiment to the mixing system 800 of FIG. 8, the first container engagement component 820 may be omitted in favor of forming the shaft 840 as a single piece with the cap portion 814 of the container 810.

As another alternative, one or more components of a mixing system may extend outside a container, or may connect to other elements accessible from outside the container, to enable a user to move the components within the container without repetitive motion of the container. For example, the mixing system 500 of FIG. 5 may be actuated to mix ingredients within the container 510 by user-actuation of the actuation interface 544 that is accessible through the actuation aperture 516 of the cap portion 514 of the container 510, as described previously. Similar actuation may be used in connection with a mixing system like the mixing system 800 of FIG. 8. If desired, various handles, knobs, and/or other actuation interfaces may protrude from a container, and may be shaped to be easily gripped and rotated, actuated in repetitive linear fashion, and/or the like. Such protruding actuation interfaces may, if desired, be detachable to keep the profile of the container compact. A detachable actuation interface may be coupled to the exterior of the container, used to actuate the mixing system to mix the ingredients, and then detached once mixing is complete.

Returning to the mixing system 800 depicted in FIG. 9, the shaft 840 may have a cross-sectional shape that is circular or non-circular. According to some embodiments, the shaft 840 may have a cross-sectional shape with a generally circular outer profile, with a flat section 940. As also shown in FIG. 9, the flat section 940 may have a plurality of rotational stops 950 that interrupt the generally planar shape of the flat section. The rotational stops 950 may, for example, be indentations that receive corresponding protrusions (shown in FIG. 11) extending inward from the stationary mixing members 844. The protrusions of the stationary mixing members 844 may extend inwardly to engage the rotational stops 950 to keep the stationary mixing members 844 from rotating about the shaft 840. The rotatable mixing members 842 may have no such protrusions, and need not be aligned with the rotational stops. Thus, the rotatable mixing members 842 may be relatively freely rotatable about the axis 118 while the stationary mixing members 844 are unable to rotate about the axis 118.

As shown, the first container engagement component 820 may be formed as a single piece with the shaft 840. A plurality of webs 960 (for example, four) may join the first container engagement component 820 to the shaft 840, and may be integrally formed with the shaft 840 and the first container engagement component 820. The webs 960 may be distributed about the axis 118 such that apertures between the webs 960. The apertures may include radial apertures 970 oriented generally perpendicular to radii extending from the axis 118. The configuration and operation of the webs 960 and radial apertures 970 will be shown and described in greater detail in connection with FIG. 10.

Figure 10:
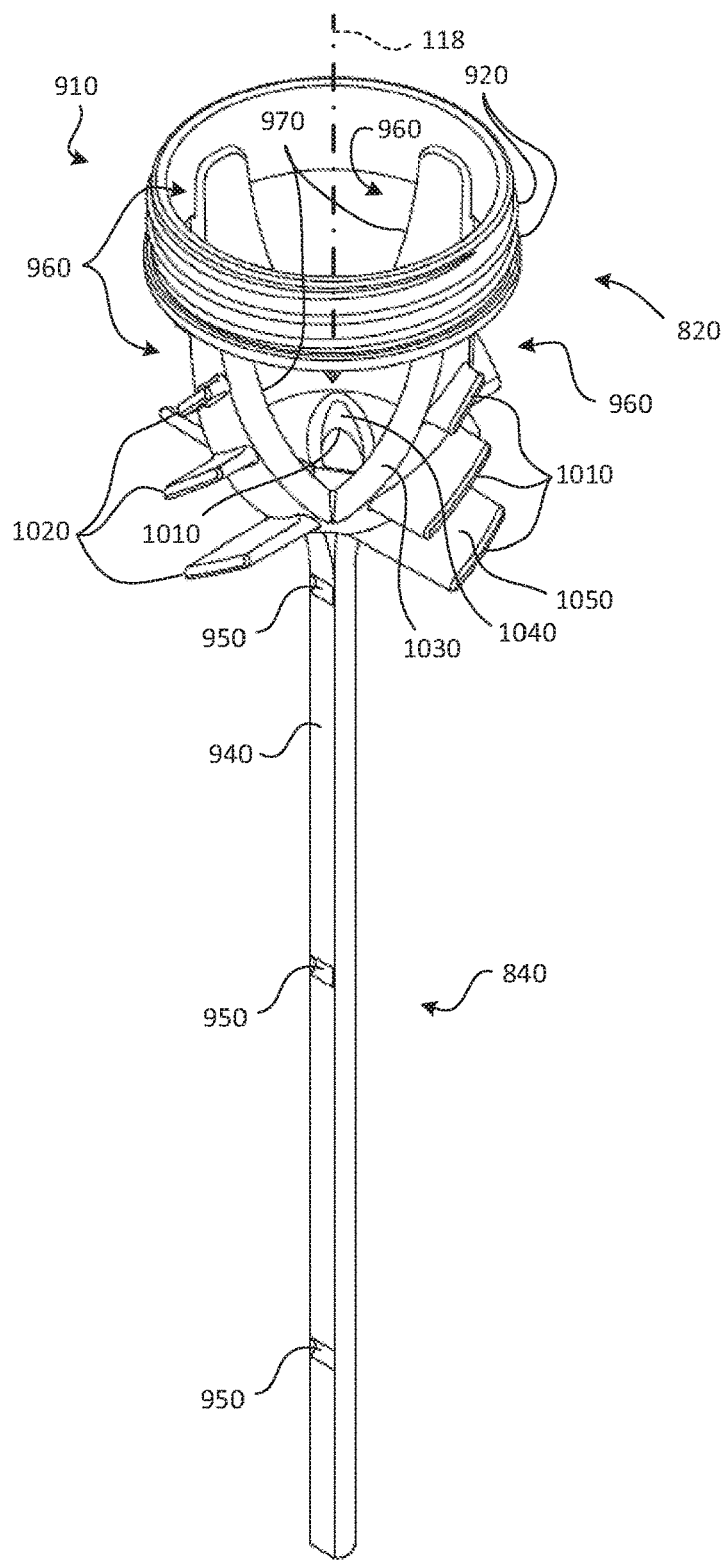
FIG. 10 is a perspective view depicting of the first container engagement component, the shaft, and the webs the mixing system of FIG. 8 in greater detail.

Referring to FIG. 10, a perspective view depicts the first container engagement component 820, the shaft 840, and the webs 960 of the mixing system 800 of FIG. 8 in greater detail. As mentioned previously, these parts may all be formed as a single piece. Injection molding and/or other manufacturing methods known in the art may be used.

As shown, each of the webs 960 may have a generally curved shape extending from the first container engagement component 820 to the shaft 840. The radial apertures 970 may each have a generally triangular shape defined by the edges of the two adjacent webs 960 and the adjacent rim of the first container engagement component 820. In addition to the radial apertures 970, the webs 960 may also define a plurality of axial apertures 1010 that are oriented generally parallel to the axis 118.

The apertures between the webs 960 may cooperate to facilitate flow of ingredients from the interior of the bottle portion 812 to the opening (for example, the drinking aperture 116 of the cap portion 814). Specifically, radial apertures 970 may facilitate flow of ingredients along generally radial directions (from the outer portion of the bottle portion 812 surrounding the webs 960 to the axis 118), and the axial apertures 1010 may facilitate flow of ingredients along generally axial directions (from the portion of the bottle portion 812 beneath the webs 960 to the space above the shaft 840, bounded by the webs 960). Each of the webs 960 may have a plurality of fins 1020 that extends radially outward, away from the axis 118, toward the exterior wall of the bottle portion 812 of the container 810. The fins 1020 maybe angled in such a manner that ingredients flowing between the fins 1020, toward the opening of the container 810, are directed to flow through the radial apertures 970.

As the ingredients flow through the radial apertures 970 and the axial apertures 1010, further mixture may occur. Specifically, the radial apertures 970 may have radial aperture mixing surfaces 1030, the axial apertures 1010 may have axial aperture mixing surfaces 1040, and the fins 1020 may have fin mixing surfaces 1050. The radial aperture mixing surfaces 1030, the axial aperture mixing surfaces 1040, and the fin mixing surfaces 1050 may all contact the ingredients in a manner that promotes fluid shear as the ingredients flow around these surfaces. Additionally or alternatively, currents of fluid flowing in different directions may mix and intermingle at these surfaces, promoting intermixture.

These surfaces may facilitate mixture of the ingredients together in response to repetitive motion of the container 810 as described previously, and/or in response to flow of the ingredients toward the drinking aperture 116, as when a user tilts the container 810 to pour ingredients into his or her mouth. Thus, if any of the ingredients that have not been sufficiently mixed together prior to discharge from the container 810, these ingredients may be mixed together by the radial aperture mixing surfaces 1030, the axial aperture mixing surfaces 1040, and/or the fin mixing surfaces 1050.

Of course, further mixture of the ingredients may occur due to interaction of the ingredients with the adjacent stationary mixing member 844 and the rotatable mixing members 842. These components will be shown in greater detail in connection with FIGS. 11 and 12, respectively.

Figure 11:
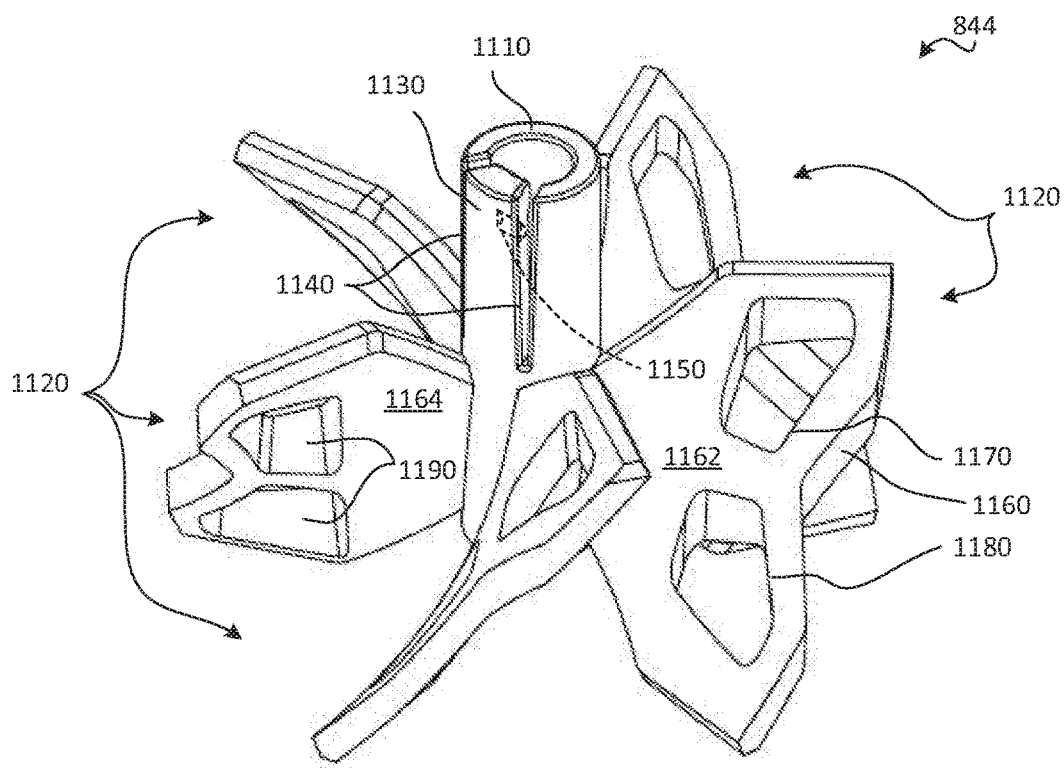
FIG. 11 is a perspective view depicting one of the stationary mixing members of the mixing system of FIG. 8 in greater detail.

Referring to FIG. 11, a perspective view depicts one of the stationary mixing members 844 of the mixing system 800 of FIG. 8, in greater detail. As depicted, the stationary mixing member 844 may have a stationary inner rim 1110 and a plurality of vanes 1120 (for example, five vanes 1120) that extend generally radially outward from the stationary inner rim 1110. The stationary inner rim 1110 may be nonrotatably secured to the shaft 840.

As shown, the stationary inner rim 1110 may have a flexure portion 1130 separated from the remainder of the stationary inner rim 1110 by slits 1140. The flexure portion 1130 may have a protrusion 1150 that extends inward, toward the axis 118 (not shown in FIG. 11). The protrusion 1150 may be shaped to be received by rotational stops 950 of the flat section 940 of the shaft 840. The flexure portion 1130 may flex outward to permit the protrusion 1150 to pass over the portions of the flat section 940 of the shaft 840, between the rotational stops 950. When the protrusion 1150 is aligned with one of the rotational stops 950, the protrusion 1150 may be urged into the rotational stop 950 via relief of the flexure in the flexure portion 1130.

The protrusion 1150 may have tapered top and bottom ends that facilitate removal of the protrusion 1150 from the rotational stop 950 in response to force urging the stationary mixing member 844 to move along the axis 118. Thus, renewed flexure of the flexure portion 1130 may be used to remove the protrusion 1150 from a rotational stop 950, for example, to permit removal of the stationary mixing member 844 from the shaft 840, or motion of the stationary mixing member 844 to a different rotational stop 950. The protrusion 1150 may have flat surfaces on either lateral side that abut corresponding flat surfaces of the rotational stop 950 to prevent significant rotation of the stationary mixing member 844 relative to the shaft 840.

Each of the vanes 1120 may extend generally radially outward from the stationary inner rim 1110, and may terminate in an outer edge 1160 that extends generally along a straight line. The vanes 1120 may each have a generally triangular shape, with one point of the triangle joined with the stationary inner rim 1110, and the other two points of the triangle defining opposite ends of the line followed by the outer edge 1160. Each of the vanes 1120 may have a first mixing surface 1162 and a second mixing surface 1164 on an opposite side of the vane 1120 from the first mixing surface 1162.

As further shown in FIG. 11, each of the vanes 1120 may have a first window 1170 and a second window 1180. The first window 1170 and the second window 1180 may cooperate to define a plurality of window mixing surfaces 1190 that contact ingredients flowing through the first window 1170 and the second window 1180 to facilitate mixture of the ingredients together as they flow through the first window 1170 and the second window 1180. The first window 1170 and the second window 1180 may have somewhat complex shapes as shown, with several edges and/or points, to increase the number of the window mixing surfaces 1190 and/or provide for more sharply-angled edges between the window mixing surfaces 1190 and the surrounding surfaces of the vanes 1120.

The number and configuration of the windows in the vanes 1120 is merely exemplary. In other embodiments, vanes may have no windows, one window, or more than two windows. Such windows may have any shape, and may, if desired, have one or more bridging members like the bridging members 350 of the mixing members 142 of FIGS. 1 through 4.

Figure 12:
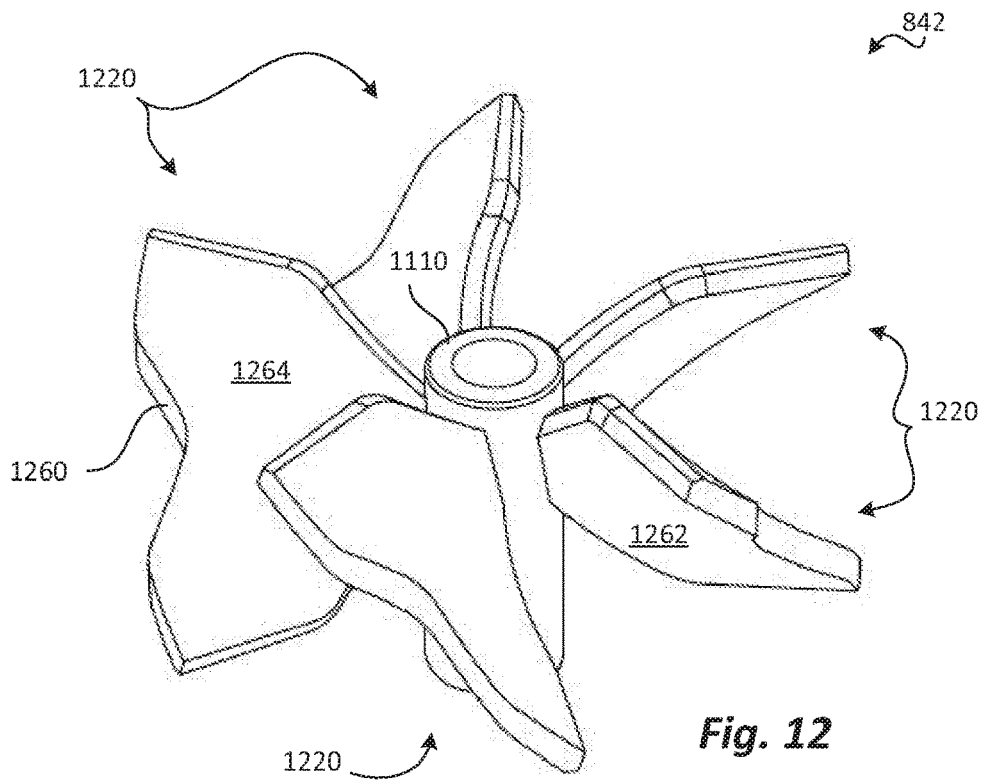
FIG. 12 is a perspective view depicting one of the rotatable mixing members of the mixing system of FIG. 8 in greater detail.

Referring to FIG. 12, a perspective view depicts one of the rotatable mixing members 842 of the mixing system 800 of FIG. 8, in greater detail. As depicted, the rotatable mixing member 842 may have a rotatable inner rim 1210 and a plurality of vanes 1220 (for example, five vanes 1220) that extend generally radially outward from the rotatable inner rim 1210. The rotatable inner rim 1210 may be rotatably coupled to the shaft 840 such that the rotatable mixing members 842 is able to rotate relatively freely about the shaft 840.

Each of the vanes 1220 may extend generally radially outward from the rotatable inner rim 1210, and may terminate in an outer edge 1260 that extends generally along a straight line. Like the vanes 1120 of the stationary mixing members 844, the vanes 1220 may each have a generally triangular shape, with one point of the triangle joined with the rotatable inner rim 1210, and the other two points of the triangle defining opposite ends of the line followed by the outer edge 1260. Each of the vanes 1220 may have a first mixing surface 1262 and a second mixing surface 1264 on an opposite side of the vane 1220 from the first mixing surface 1262.

The vanes 1220 may have no windows. In alternative embodiments, each of the vanes 1220 may have one or more windows, which may be similar to the first window 1170 and the second window 1180 of the vanes 1120 of the stationary mixing members 844.

The outer edge 1160 of each vane 1120 of each stationary mixing member 844 and the outer edge 1260 of each vane 1220 of each rotatable mixing member 842 may be oriented in a manner that helps expedite mixture of the ingredients together. This will be shown and described in connection with FIGS. 13 and 14, as follows.

Figure 13:
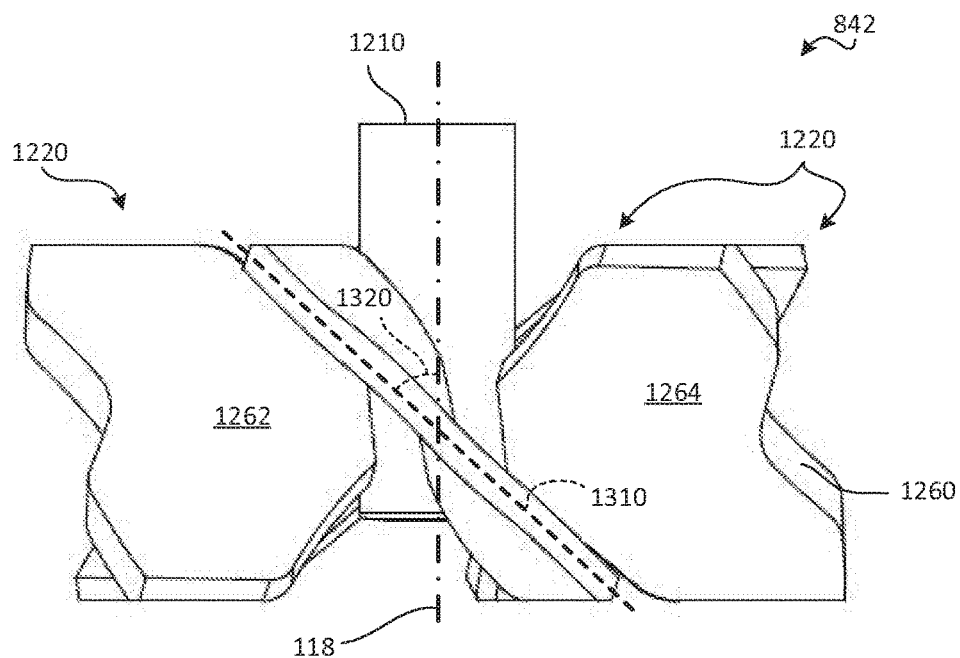
FIG. 13 is a side elevation view depicting one of the rotatable mixing members of the mixing system of FIG. 8.

Referring to FIG. 13, a side elevation view depicts one of the rotatable mixing members 842 of the mixing system 800 of FIG. 8. As indicated previously, the outer edge 1260 of each of the vanes 1220 of the rotatable mixing member 842 may follow a generally linear path. This generally linear path 1310 is depicted with greater clarity in FIG. 13, which shows an edge view of one of the vanes 1220 of the rotatable mixing member 842.

The generally linear path 1310 may be angled, relative to the axis 118, at an angle 1320 selected to enhance the effectiveness of the first mixing surface 1262 and the second mixing surface 1264 at mixing the ingredients together. In some embodiments, the angle 1320 may fall within the range of −20° to −70°. More specifically, the angle 1320 may fall within the range of −30° to −60°. Yet more specifically, the angle 1320 may fall within the range of −40° to −50°. Still more specifically, the angle 1320 may be about −45°. These angular ranges may provide a favorable balance between the rotational speed of the rotatable mixing members 842 and the angle at which the first mixing surface 1262 and the second mixing surface 1264 of each vane 1220 of each rotatable mixing members 842 impinges on the ingredients.

Figure 14:
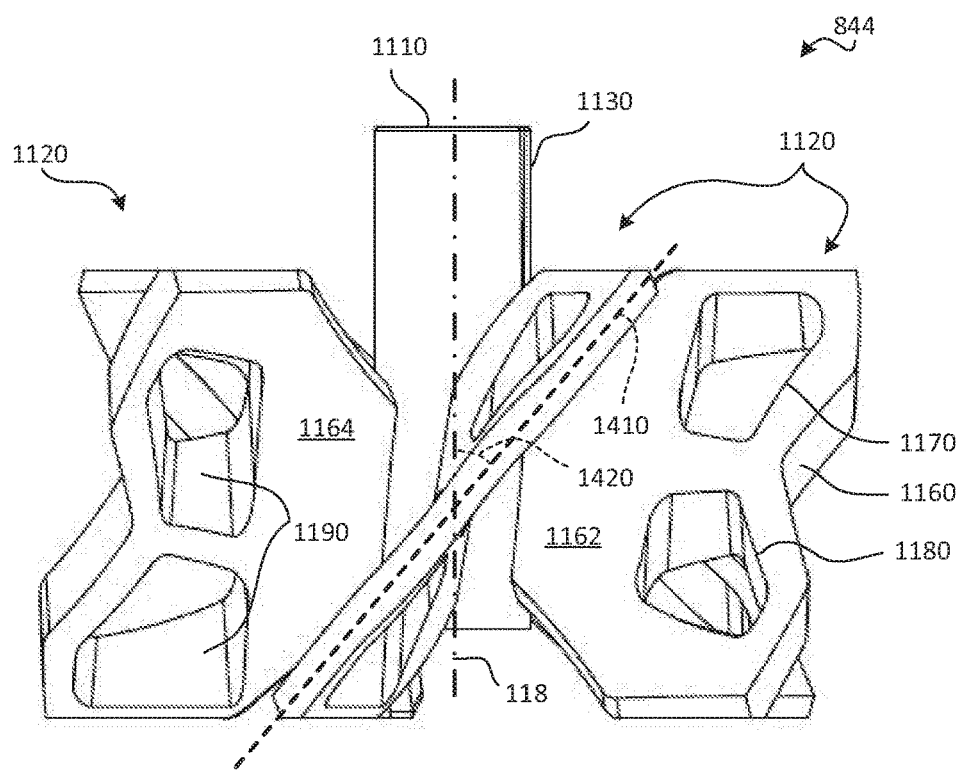
FIG. 14 is a side elevation view depicting one of the stationary mixing members of the mixing system of FIG. 8.

Referring to FIG. 14, a side elevation view depicts one of the stationary mixing members 844 of the mixing system 800 of FIG. 8. As indicated previously, the outer edge 1160 of each of the vanes 1120 of the stationary mixing member 844 may follow a generally linear path. This generally linear path 1410 is depicted with greater clarity in FIG. 14, which shows an edge view of one of the vanes 1120 of the stationary mixing member 844.

The generally linear path 1410 may be angled, relative to the axis 118, at an angle 1420 selected to enhance the effectiveness of the first mixing surface 1162 and the second mixing surface 1164 at mixing the ingredients together. In some embodiments, the angle 1420 may fall within the range of 20° to 70°. More specifically, the angle 1320 may fall within the range of 30° to 60°. Yet more specifically, the angle 1320 may fall within the range of 40° to 50°. Still more specifically, the angle 1320 may be about 45°.

Notably, the angle 1420 may be substantially equal and opposite to the angle 1320. Thus, the vanes 1220 and the vanes 1120 may be angled in opposite directions, as depicted in FIG. 8. This may further enhance mixture of the ingredients together, as fluid moving along the surface of a vane (for example, along the first mixing surface 1262 of a vane 1220 of one of the rotatable mixing member 842) may be redirected at an angle of about 90° as the fluid impinges impinges on the corresponding surface of an adjacent mixing member (for example, the second mixing surface 1164 of a vane 1120 of the adjacent stationary mixing member 844 that is adjacent to the rotatable mixing member 842). Thus, the opposing angles of the vanes 1220 and the vanes 1120 may help to make flow of ingredients within the container 810 more turbulent, thereby facilitating and expediting mixture of the ingredients.

Any methods disclosed herein comprise one or more steps or actions for performing the described method. The method steps and/or actions may be interchanged with one another. In other words, unless a specific order of steps or actions is required for proper operation of the embodiment, the order and/or use of specific steps and/or actions may be modified.

Reference throughout this specification to "an embodiment" or "the embodiment" means that a particular feature, structure or characteristic described in connection with that embodiment is included in at least one embodiment. Thus, the quoted phrases, or variations thereof, as recited throughout this specification are not necessarily all referring to the same embodiment.

Similarly, it should be appreciated that in the above description of embodiments, various features are sometimes grouped together in a single embodiment, Figure, or description thereof for the purpose of streamlining the disclosure. This method of disclosure, however, is not to be interpreted as reflecting an intention that any claim require more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

Recitation in the claims of the term "first" with respect to a feature or element does not necessarily imply the existence of a second or additional such feature or element. Elements recited in means-plus-function format are intended to be construed in accordance with 35 U.S.C. § 112 Para. 6. It will be apparent to those having skill in the art that changes may be made to the details of the above-described embodiments without departing from the underlying principles of the invention.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

What is claimed is:

1. A mixing system comprising:
    a container comprising:
        a bottle portion comprising an interior; and
        a cap portion comprising a drinking aperture usable to directly imbibe ingredients from the container;
    a container engagement component comprising one or more container engagement surfaces; and
    a mixing component coupled to the container engagement component, the mixing component comprising:
        a shaft extending along an axis; and
        a plurality of rotatable mixing members arranged along the shaft;
    wherein:
        the one or more container engagement surfaces are positioned to engage the interior to keep the mixing component in place relative to the container;
        each of the rotatable mixing members comprises a plurality of rotatable mixing surfaces; and
        the rotatable mixing members are coupled to the shaft such that the rotatable mixing members are rotatable about the axis with the shaft stationary and non-rotating, with the mixing component disposed within the container to cause the rotatable mixing surfaces to contact the ingredients in a manner that promotes mixture of the ingredients together;
    each of the rotatable mixing members comprises:
        a rotatable inner rim that engages the shaft in a manner that permits the rotatable inner rim to rotate about the shaft; and
        a plurality of rotatable vanes extending outward from the rotatable inner rim, each rotatable vane of the plurality of rotatable vanes comprising a first rotatable mixing surface of the plurality of rotatable mixing surfaces, wherein the first rotatable mixing surface is oriented nonparallel and nonperpendicular to the axis such that motion of the ingredients along the axis induces rotation of each rotatable mixing member about the axis;
    the mixing component further comprises a plurality of stationary mixing members, each of which is fixedly secured to the shaft; and
    at least one of the rotatable mixing members is positioned between and adjacent to two of the stationary mixing members; and
    each of the stationary mixing members comprises:
        a stationary inner rim fixedly secured to the shaft; and
        a plurality of stationary vanes extending outward from the stationary inner rim, each stationary vane of the plurality of stationary vanes comprising a first stationary mixing surface oriented nonparallel and nonperpendicular to the axis such that the first stationary mixing surface cooperates with the plurality of rotatable mixing surfaces to contact the ingredients in a manner that promotes mixture of the ingredients together.

2. The mixing system of claim 1, wherein each rotatable vane of the plurality of rotatable vanes terminates at a rotatable outer edge extending generally along a substantially straight line that, when viewed from along a radius passing through the rotatable outer edge and the axis, is oriented at an angle, relative to the axis, ranging from 30° to 60°.

3. The mixing system of claim 1, wherein:
    each stationary vane of the plurality of stationary vanes comprises a first window and a second window, each of which is shaped to define window mixing surfaces; and
    the window mixing surfaces facilitate mixture together of ingredients flowing through the first window and the second window.

4. The mixing system of claim 1, wherein:
    each rotatable vane of the plurality of rotatable vanes terminates at a rotatable outer edge extending generally along a first substantially straight line that, when viewed from along a first radius passing through the rotatable outer edge and the axis, is oriented at a first angle relative to the axis;
    each stationary vane of the plurality of stationary vanes terminates at a stationary outer edge extending generally along a second substantially straight line that, when viewed from along a second radius passing through the stationary outer edge and the axis, is oriented at a second angle relative to the axis; and
    the second angle is substantially equal and opposite to the first angle.

5. The mixing system of claim 1, wherein at least one of the rotatable mixing members is positioned in close proximity to two of the stationary mixing members such that during rotation of the at least one rotatable mixing member, only narrow gaps exist between the rotatable vanes of the at least one rotatable mixing member and the stationary vanes of the two of the stationary mixing members.

6. The mixing system of claim 1, wherein:
the container comprises interior threading proximate the drinking aperture; and
the container engagement component comprises exterior threading, on which the container engagement surfaces are located, that mates with the interior threading.

7. The mixing system of claim 6, wherein:
the exterior threading is connected to the shaft by a plurality of webs that are integrally formed with the exterior threading and the shaft;
the webs are distributed about the axis to define a plurality of apertures through which the ingredients pass to move from the drinking aperture to the plurality of mixing members;
the plurality of apertures define a plurality of aperture mixing surfaces that further facilitate mixture together of ingredients flowing through the plurality of apertures;
each of the webs comprises a plurality of fins projecting outward from the axis; and
each of the fins is oriented at an angle nonparallel and nonperpendicular to the axis to direct ingredients flowing between the fins and toward the drinking aperture to flow through the plurality of apertures.

8. A mixing system comprising:
a container comprising:
a bottle portion comprising an interior; and
a cap portion comprising a drinking aperture usable to directly imbibe ingredients from the container;
a container engagement component comprising one or more container engagement surfaces; and
a mixing component coupled to the container engagement component, the mixing component comprising:
a shaft extending along an axis;
a plurality of rotatable mixing members arranged along the shaft; and
a plurality of stationary mixing members arranged along the shaft;
wherein:
the one or more container engagement surfaces are positioned to engage the interior to keep the mixing component in place relative to the container;
each of the rotatable mixing members comprises:
a rotatable inner rim that engages the shaft in a manner that permits the rotatable inner rim to rotate about the shaft; and
a plurality of rotatable vanes extending outward from the rotatable inner rim, each rotatable vane of the plurality of rotatable vanes comprising a first rotatable mixing surface oriented nonparallel and nonperpendicular to the axis such that motion of the ingredients along the axis induces rotation of each rotatable mixing member about the axis to cause the first rotatable mixing surface to contact the ingredients in a manner that promotes mixture of the ingredients together;
each of the stationary mixing members comprises:
a stationary inner rim fixedly secured to the shaft; and
a plurality of stationary vanes extending outward from the stationary inner rim, each stationary vane of the plurality of stationary vanes comprising a first stationary mixing surface oriented nonparallel and nonperpendicular to the axis such that the first stationary mixing surface cooperates with the rotatable mixing surfaces to contact the ingredients in a manner that promotes mixture of the ingredients together;
each rotatable vane of the plurality of rotatable vanes terminates at a rotatable outer edge extending generally along a first substantially straight line that, when viewed from along a first radius passing through the rotatable outer edge and the axis, is oriented at a first angle relative to the axis;
each stationary vane of the plurality of stationary vanes terminates at a stationary outer edge extending generally along a second substantially straight line that, when viewed from along a second radius passing through the stationary outer edge and the axis, is oriented at a second angle relative to the axis;
the first angle is within the range of 30° to 60';
the second angle is substantially equal and opposite to the first angle;
each stationary vane of the plurality of stationary vanes comprises a window shaped to define window mixing surfaces that facilitate mixture together of ingredients flowing through the window;
at least one of the rotatable mixing members is positioned in close proximity to two of the stationary mixing members such that during rotation of the at least one rotatable mixing member, only narrow gaps exist between the rotatable vanes of the at least one rotatable mixing member and the stationary vanes of the two of the stationary mixing members; and
the rotatable mixing members are coupled to the shaft such that the rotatable mixing members are rotatable about the axis with the shaft stationary and non-rotating.

9. The mixing system of claim 1, wherein each of the rotatable mixing surfaces is oriented to cause rotation of the rotatable mixing members in response to motion of the ingredients along the axis.

10. A mixing system comprising:
a container comprising:
a bottle portion comprising an interior; and
a cap portion comprising a drinking aperture usable to directly imbibe ingredients from the container;
a container engagement component comprising one or more container engagement surfaces; and
a mixing component coupled to the container engagement component, the mixing component comprising:
a shaft extending along an axis; and
a plurality of rotatable mixing members arranged along the shaft;
wherein:
the one or more container engagement surfaces are positioned to engage the interior to keep the mixing system in place relative to the container;
each of the rotatable mixing members comprises a plurality of rotatable mixing surfaces; and
the rotatable mixing members are coupled to the shaft such that the rotatable mixing members are rotatable about the axis with the shaft stationary and non-rotating, with the mixing component disposed within the container to cause the rotatable mixing surfaces to contact the ingredients in a manner that promotes mixture of the ingredients together;

the container comprises interior threading proximate the drinking aperture; and the container engagement component comprises exterior threading, on which the container engagement surfaces are located, that mates with the interior threading;

the exterior threading is connected to the shaft by a plurality of webs that are integrally formed with the exterior threading and the shaft;

the webs are distributed about the axis to define a plurality of apertures through which the ingredients pass to move from the drinking aperture to the plurality of mixing members;

the plurality of apertures define a plurality of aperture mixing surfaces that further facilitate mixture together of ingredients flowing through the plurality of apertures;

each of the webs comprises a plurality of fins projecting outward from the axis; and each of the fins is oriented at an angle nonparallel and nonperpendicular to the axis to direct ingredients flowing between the fins and toward the drinking aperture to flow through the plurality of apertures.

11. The mixing system of claim 8, wherein:
the container comprises interior threading proximate the drinking aperture; and
the container engagement component comprises exterior threading, on which the container engagement surfaces are located, that mates with the interior threading.

12. The mixing system of claim 11, wherein:
the exterior threading is connected to the shaft by a plurality of webs that are integrally formed with the exterior threading and the shaft;
the webs are distributed about the axis to define a plurality of apertures through which the ingredients pass to move from the drinking aperture to the plurality of mixing members;
the apertures define a plurality of aperture mixing surfaces that further facilitate mixture together of ingredients flowing through the apertures;
each of the webs comprises a plurality of fins projecting outward from the axis; and
each of the fins is oriented at an angle nonparallel and nonperpendicular to the axis to direct ingredients flowing between the fins and toward the drinking aperture to flow through the apertures.

13. The mixing system of claim 10, wherein each of the rotatable mixing members comprises:
a rotatable inner rim that engages the shaft in a manner that permits the rotatable inner rim to rotate about the shaft; and
a plurality of rotatable vanes extending outward from the rotatable inner rim, each rotatable vane of the plurality of rotatable vanes comprising a first rotatable mixing surface of the plurality of rotatable mixing surfaces, wherein the first rotatable mixing surface is oriented nonparallel and nonperpendicular to the axis such that motion of the ingredients along the axis induces rotation of each rotatable mixing member about the axis.

14. The mixing system of claim 13, wherein each rotatable vane of the plurality of rotatable vanes terminates at a rotatable outer edge extending generally along a substantially straight line that, when viewed from along a radius passing through the rotatable outer edge and the axis, is oriented at an angle, relative to the axis, ranging from 30° to 60°.

15. The mixing system of claim 13, wherein:
the mixing component further comprises a plurality of stationary mixing members, each of which is fixedly secured to the shaft; and
at least one of the rotatable mixing members is positioned between and adjacent to two of the stationary mixing members.

16. The mixing system of claim 15, wherein each of the stationary mixing members comprises:
a stationary inner rim fixedly secured to the shaft; and
a plurality of stationary vanes extending outward from the stationary inner rim, each stationary vane of the plurality of stationary vanes comprising a first stationary mixing surface oriented nonparallel and nonperpendicular to the axis such that the first stationary mixing surface cooperates with the plurality of rotatable mixing surfaces to contact the ingredients in a manner that promotes mixture of the ingredients together.

17. The mixing system of claim 16, wherein:
each stationary vane of the plurality of stationary vanes comprises a first window and a second window, each of which is shaped to define window mixing surfaces; and
the window mixing surfaces facilitate mixture together of ingredients flowing through the first window and the second window.

18. The mixing system of claim 16, wherein:
each rotatable vane of the plurality of rotatable vanes terminates at a rotatable outer edge extending generally along a first substantially straight line that, when viewed from along a first radius passing through the rotatable outer edge and the axis, is oriented at a first angle relative to the axis;
each stationary vane of the plurality of stationary vanes terminates at a stationary outer edge extending generally along a second substantially straight line that, when viewed from along a second radius passing through the stationary outer edge and the axis, is oriented at a second angle relative to the axis; and
the second angle is substantially equal and opposite to the first angle.

19. The mixing system of claim 16, wherein at least one of the rotatable mixing members is positioned in close proximity to two of the stationary mixing members such that during rotation of the at least one rotatable mixing member, only narrow gaps exist between the rotatable vanes of the at least one rotatable mixing member and the stationary vanes of the two of the stationary mixing members.

* * * * *